US012654316B1

(12) United States Patent　　　　　(10) Patent No.: US 12,654,316 B1
Hsiao et al.　　　　　　　　　　　　　(45) Date of Patent: Jun. 16, 2026

(54) LAB AUTOMATION AND RELATED SYSTEMS AND METHODS

(71) Applicant: Streamline Bio Taiwan, Zhubei City (TW)

(72) Inventors: Yu-Shun Hsiao, Cambridge, MA (US); Zheng-Lung Wu, Zhubei City (TW); Yu-Hao Huang, Zhubei City (TW)

(73) Assignee: Streamline Bio Taiwan, Zhubei City (TW)

( * ) Notice: Subject to any disclaimer, the term of this patent is extended or adjusted under 35 U.S.C. 154(b) by 0 days.

(21) Appl. No.: 19/033,317

(22) Filed: Jan. 21, 2025

(51) Int. Cl.
*B25J 9/16*　　　(2006.01)
*B25J 19/02*　　(2006.01)

(52) U.S. Cl.
CPC .............. *B25J 9/163* (2013.01); *B25J 9/161* (2013.01); *B25J 9/1664* (2013.01); *B25J 9/1671* (2013.01); *B25J 19/02* (2013.01)

(58) Field of Classification Search
CPC . G05B 2219/40391; G05B 2219/40607; B25J 13/00; B25J 13/02; B25J 13/085; B25J 13/006; B25J 9/1612; B25J 9/163; B25J 9/1653; B25J 9/1664; B25J 9/1669; B25J 9/1697; B25J 9/161; B25J 9/1671; B25J 19/02; G16B 5/00; G01N 35/00584; G01N 35/0099; G06T 19/006; G16H 10/40; C12M 41/48
See application file for complete search history.

(56) References Cited

U.S. PATENT DOCUMENTS

| | | | |
|---|---|---|---|
| 5,513,303 | A | 4/1996 | Robertson et al. |
| 2003/0090483 | A1* | 5/2003 | Watanabe .............. B25J 9/1671 |
| | | | 345/419 |
| 2005/0260745 | A1 | 11/2005 | Domansky et al. |
| 2007/0059209 | A1 | 3/2007 | Pang et al. |
| 2008/0240898 | A1 | 10/2008 | Manz et al. |
| 2010/0274389 | A1 | 10/2010 | Ortmaier et al. |
| 2011/0190937 | A1 | 8/2011 | Ortmaier |
| 2012/0029694 | A1 | 2/2012 | Muller |
| 2012/0116416 | A1 | 5/2012 | Neff et al. |
| 2012/0265071 | A1 | 10/2012 | Berke |
| 2015/0304634 | A1 | 10/2015 | Karvounis |
| 2017/0217027 | A1* | 8/2017 | Boucard ................ B25J 19/023 |
| 2018/0082435 | A1 | 3/2018 | Whelan et al. |

(Continued)

FOREIGN PATENT DOCUMENTS

| | | | |
|---|---|---|---|
| JP | 2020122760 A | * | 8/2020 |
| WO | 2024092082 A1 | | 5/2024 |

OTHER PUBLICATIONS

Translation of JP 2020122760 A (Year: 2020).*

(Continued)

*Primary Examiner* — Adam R Mott
*Assistant Examiner* — James Miller Watts, III
(74) *Attorney, Agent, or Firm* — Procopio, Cory, Hargreaves & Savitch LLP

(57)　　　　　　ABSTRACT
The present disclosure relates to a system that comprises a lab space housing multiple workstations comprising at least two workstations each performing a different type of bio lab task from another. The lab space can have a lab floor space comprising an occupied lab floor space on which the multiple workstations are occupied, and an unoccupied lab floor space on which a stand-alone robotic arm moves through.

23 Claims, 9 Drawing Sheets

(56) References Cited

U.S. PATENT DOCUMENTS

| | | | |
|---|---|---|---|
| 2019/0242916 A1* | 8/2019 | Guarracina | B25J 9/1676 |
| 2019/0291277 A1* | 9/2019 | Oleynik | B25J 9/1669 |
| 2021/0016454 A1* | 1/2021 | Jeong | B25J 15/0616 |
| 2021/0031375 A1* | 2/2021 | Drumwright | B25J 9/1612 |
| 2021/0339399 A1* | 11/2021 | Schluntz | G05D 1/0088 |
| 2023/0331416 A1* | 10/2023 | Matl | B25J 9/1697 |
| 2025/0026008 A1* | 1/2025 | Wang | B25J 9/1666 |

OTHER PUBLICATIONS

NVIDIA—developer.nvidia.com [online], "Accelerating Robotics Simulation with NVIDIA Omniverse Isaac Sim," Sep. 9, 2020, retrieved on Apr. 22, 2024, retrieved from URL<https://developer.nvidia.com/blog/accelerating-robotics-simulation-with-nvidia-omniverse-isaac-sim//> (Year: 2020).*

International Search Report and Written Opinion dated Mar. 13, 2026 in international application No. PCT/US2026/012056.

Knobbe et al. "Core processes in intelligent robotic lab assistants: Flexible liquid handling." 2022 IEEE/RSJ international conference on intelligent robots and systems (IROS). IEEE, 2022. Retrieved on Mar. 9, 2026 (Mar. 9, 2026) from <https://www.researchgate.net/profile/Dennis-Knobbe/publication/366615995_Core_Processes_in_Intelligent_Robotic_Lab_Assistants_Flexible_Liquid_Handling/links/66b9d4042361f42f23cbdfd9/Core-Processes-in-Intelligent-Robotic-Lab-Assistants-Flexible-Liquid-Handling.pdf>.

Zhang et al. "Reliable grasping of three-dimensional untethered mobile magnetic microgripp er for autonomous pick-and-place." IEEE Robotics and Automation Letters 2.2 (2017): 835-840. Retrieved on Mar. 9, 2026 (Mar. 9, 2026) from <https://microrobotics.mie.utoronto.ca/wp-content/uploads/2017/02/RA-L-paper-before-proof-read.pdf>.

* cited by examiner

STEP 101. Various types of data related to operating the moving device are recorded.

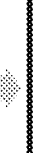

STEP 102. Artificial intelligence processor instructions or a machine learning classifier can be trained in response to recorded data.

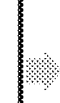

STEP 103. The trained artificial intelligence or trained machine learning classifier can be validated.

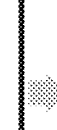

STEP 104. Data for operation is input into trained artificial intelligence or trained machine learning classifier.

STEP 105. Information input for operation can be input into trained artificial intelligence or machine learning classifier.

STEP 106. Data or parameters are recorded or updated related to a moving device operation during the operation.

STEP 107. The trained artificial intelligence or trained machine learning classifier is updated in response to the data or parameters

FIG. 5

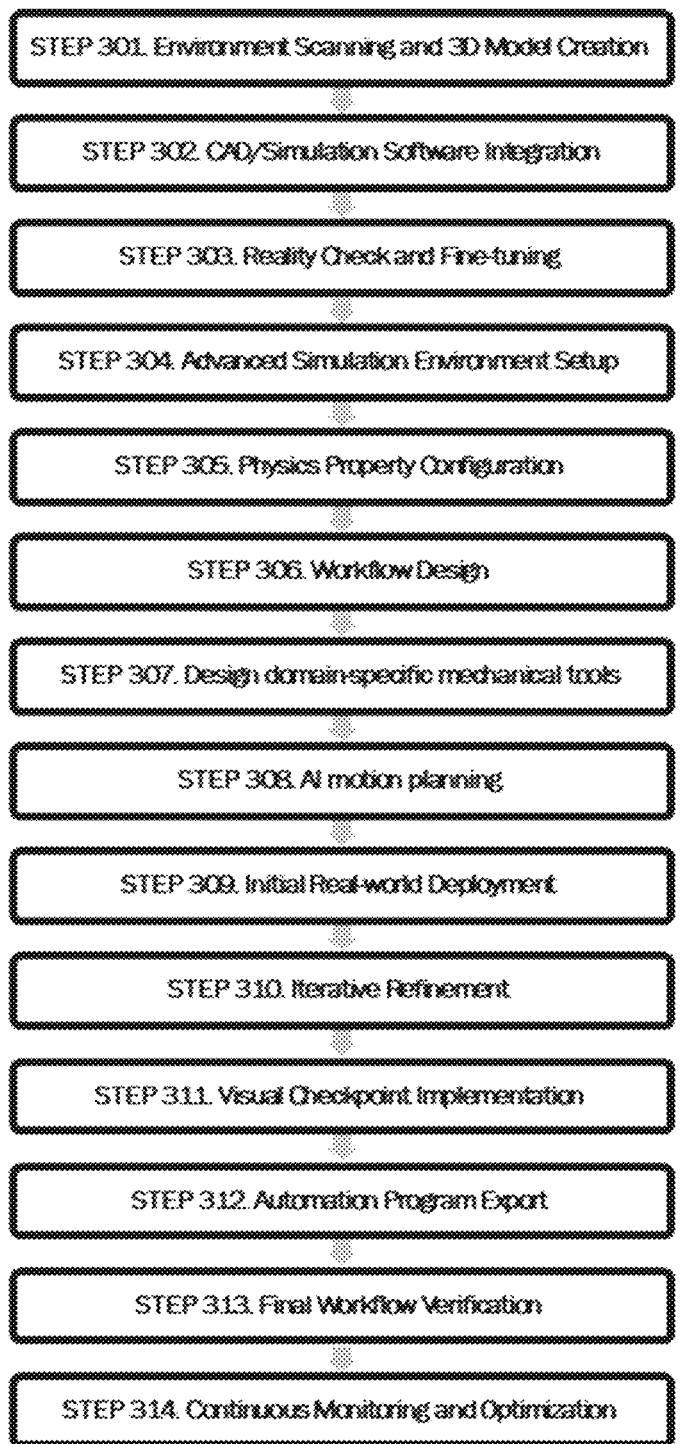

STEP 301. Environment Scanning and 3D Model Creation

STEP 302. CAD/Simulation Software Integration

STEP 303. Reality Check and Fine-tuning

STEP 304. Advanced Simulation Environment Setup

STEP 305. Physics Property Configuration

STEP 306. Workflow Design

STEP 307. Design domain-specific mechanical tools

STEP 308. AI motion planning

STEP 309. Initial Real-world Deployment

STEP 310. Iterative Refinement

STEP 311. Visual Checkpoint Implementation

STEP 312. Automation Program Export

STEP 313. Final Workflow Verification

STEP 314. Continuous Monitoring and Optimization

FIG. 6

LAB AUTOMATION AND RELATED SYSTEMS AND METHODS

BACKGROUND

Laboratory work can be a fundamental aspect of scientific research and experimentation across various disciplines such as biology, chemistry, physics, engineering, and medicine. It involves conducting experiments, gathering data, and analyzing results in a controlled environment to test hypotheses, validate theories, and advance knowledge in the respective fields. With the advancement of science and technology, lab and preparatory work involving reagents and cleaning solutions in biology, chemistry, and other laboratory settings is increasingly recognized.

SUMMARY

This Summary is provided to introduce a selection of concepts in simplified form that can be further described below in the Detailed Description. This Summary is not intended to identify key aspects or essential aspects of the claimed subject matter.

In some aspects, the techniques described herein relate to a method of controlling a robotic device to manipulate at least one workstation including plurality of workstations associated with a biological process in a space, including: obtaining, by at least one hardware processor, description data associated with a three-dimensional (3D) model of the space, the data including first information corresponding to spatial arrangements of the at least one workstation designed to be directly operated by a human lab worker working in the space including a plurality of workstations and a plurality of objects associated with the plurality of workstations, and second information corresponding to workflow of a process to control the at least one workstation by the human lab worker using objects among the plurality of objects; assigning, by the at least one hardware processor, physical property attributes associated with properties of the plurality of objects, the physical property attributes including dynamic attributes, static attributes, at least one mass attribute, at least one force attribute, at least one torque attribute, and at least one elasticity attribute, wherein the dynamic attributes includes a dynamic attribute directly associated with an outcome of the biological process; assigning, by the at least one hardware processor, a plurality of unit operation attributes associated with unit operations to manipulate at least one object among the plurality of objects in sequence, to generate a process flow information to perform the process to control the plurality of workstations, based on the first and second information; generating, utilizing a machine learning model executed by the at least one hardware processor, instructions to perform a plurality of movements of the robotic device associated with the unit operations in the 3D model of the space, based on the assigned physical property attributes or the generated process flow information associated with the assigned plurality of unit operations; controlling, based on the generated instructions, the robotic device to execute at least one physical movement associated with at least one generated movement among the plurality of movements in the space with respect to the plurality of the objects; and obtaining, by the at least one hardware processor, at least one discrepancy in a unit operation associated with the at least one executed physical movement among the unit operations.

In some aspects, the techniques described herein relate to a method, wherein instructions to perform a plurality of movements of the robotic device includes a movement to couple the robotic device with an end module among a plurality of end modules configured to interact with the plurality of objects.

In some aspects, the techniques described herein relate to a method, wherein the plurality of end modules includes a module to interact with a deformable object or a flexible bag, a module to interact with a housing containing the deformable object or the flexible bag, a module to interact with a touch screen, a module to interact with a switch, and a module to interact with a tube connected to the flexible bag.

In some aspects, the techniques described herein relate to a method, wherein the plurality of end modules includes a mechanical tool couplable to the robotic device. In some aspects, the techniques described herein relate to a method, wherein the at least one workstation is designed to be directly operated by a human lab worker working in the space.

In some aspects, the techniques described herein relate to a method, wherein the method further includes modifying, by at least one hardware processor, the instructions to perform the plurality of movements of the robotic device associated with the unit operations in the 3D model of the space based on the at least one discrepancy.

In some aspects, the techniques described herein relate to a method, wherein the description data is generated based on 3D scanning of the space using a scanning sensor. In some aspects, the techniques described herein relate to a method, wherein the description data is generated based on 3D scanning of the space using a scanning sensor, wherein the scanning sensor is one or more scanning sensors including a LiDAR, a depth camera, a standard cameras, a radar, a sonar, a light sensor, an infrared sensor, or any combination thereof.

In some aspects, the techniques described herein relate to a method, wherein the description data is generated based on processing of data generated based on the scanning sensor using a computer vision technique. In some aspects, the techniques described herein relate to a method, wherein obtaining the description data includes arranging the plurality of objects in the 3D model of the space. In some aspects, the techniques described herein relate to a method, wherein the plurality of objects includes a bio reactor, a culturing device, a user interface, a display, automation equipment, a sensor, a control unit, an actuator, and an accessory associated with a unit operation among the plurality of unit operations.

In some aspects, the techniques described herein relate to a method, wherein the plurality of objects includes a portion of a bio reactor, a portion of a culturing device, a portion of a user interface, a portion of a display, a portion of automation equipment, a portion of a sensor, a portion of a control unit, a portion of an actuator, and a portion of an accessory associated with a unit operation among the plurality of unit operations.

In some aspects, the techniques described herein relate to a method, wherein obtaining the description data includes generating a digital representation of the space corresponding to the physical space. In some aspects, the techniques described herein relate to a method, wherein obtaining the description data includes identifying a difference between the digital representation and the physical space and modifying the digital representation based on the difference. In some aspects, the techniques described herein relate to a method, wherein obtaining the description data includes importing the 3D model into Isaac Sim application to generate the second information.

In some aspects, the techniques described herein relate to a method, wherein assigning the plurality of unit operation attributes includes defining unit operations based on the plurality of objects.

In some aspects, the techniques described herein relate to a method, wherein the plurality of objects includes a device, a machine, a consumable, a product, or a combination thereof. In some aspects, the techniques described herein relate to a method, wherein generating the process flow information includes generating an end-to-end sequence of unit operations among the plurality of unit operations.

In some aspects, the techniques described herein relate to a method, wherein generating the instructions to perform the plurality of movements of the robotic device includes using an artificial intelligence (AI) motion planning algorithm to generate a plurality of way points indicating movements of joints included in the robotic device.

In some aspects, the techniques described herein relate to a method, wherein generating the instructions to perform the plurality of movements of the robotic device includes using an artificial intelligence (AI) motion planning algorithm to generate a plurality of way points indicating movements of joints included in the robotic device to operate at one unit operation among the unit operations.

In some aspects, the techniques described herein relate to a method, wherein controlling the robotic device to execute the at least one physical movement includes deploying the at least one physical movement based on the generated process flow information in the physical space.

In some aspects, the techniques described herein relate to a method, wherein the method further includes assigning visual check point attributes to the plurality of objects for object localization in the space.

In some aspects, the techniques described herein relate to a method, wherein the method further includes assigning AprilTags as visual checkpoint attributes to the plurality of objects for object localization in the space.

In some aspects, the techniques described herein relate to a method, wherein the method further includes using the visual check point attributes to compensate for a positional or orientational error.

All features of exemplary embodiments which can be described in this disclosure and can be not mutually exclusive can be combined with one another. Elements of one embodiment can be utilized in the other embodiments without further mention. Other aspects and features of the present invention will become apparent to those ordinarily skilled in the art upon review of the following description of specific embodiments in conjunction with any accompanying Figures.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification.

BRIEF DESCRIPTION OF THE DRAWING

It is to be expressly understood that the drawings are for the purpose of illustration and description only and are not intended as a definition of the limits of the invention.

FIG. 5 illustrates an example method of operations of a moving device for locating and manipulating an object in some embodiments.

FIG. 6 illustrates an example method of setting up or executing operations of a moving device in some embodiments.

DETAILED DESCRIPTION

Figure 1:
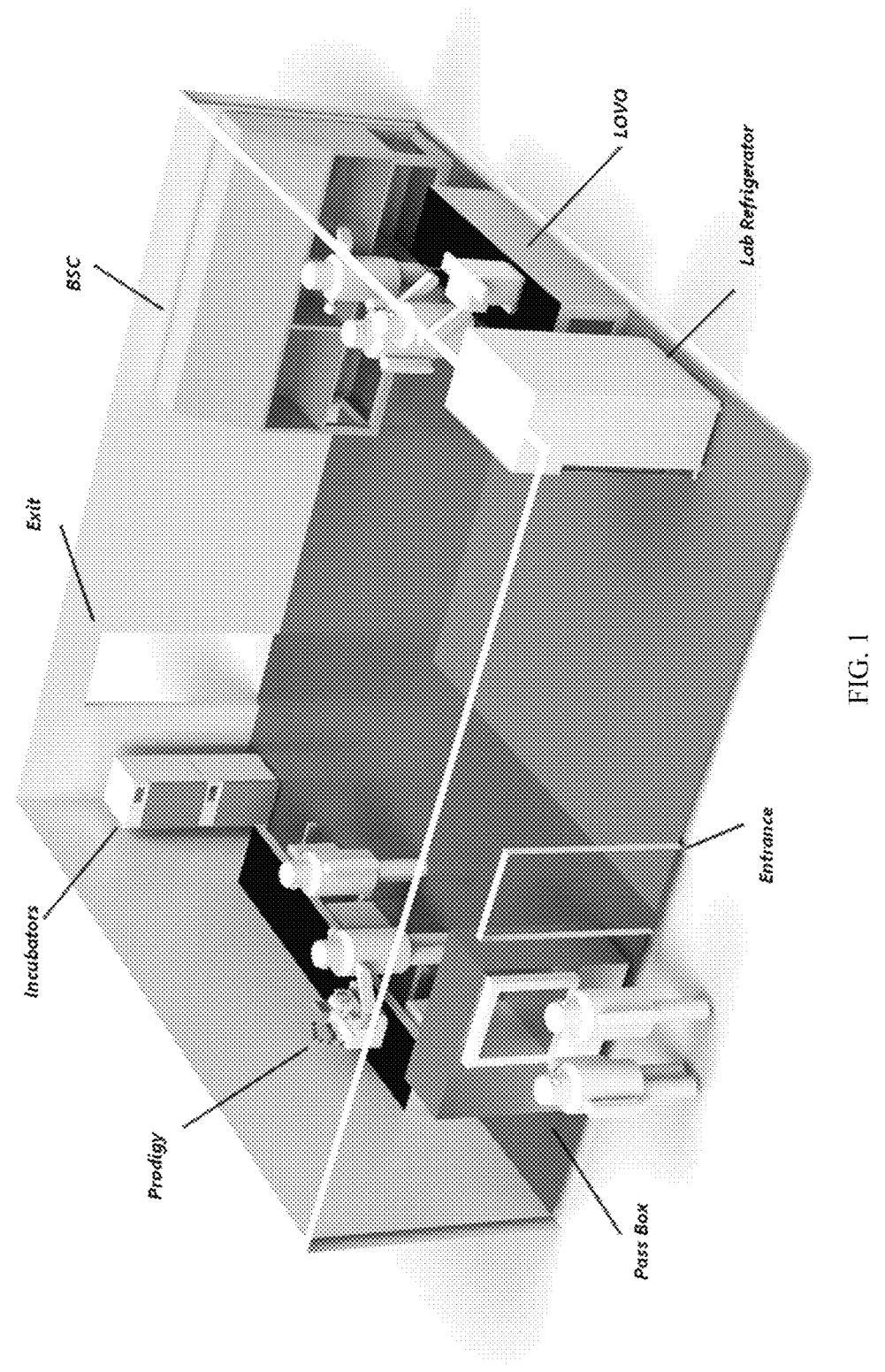
FIG. 1 illustrates an example lab system involving a plurality of human laboratory workers or technicians that are generally and currently implemented in some embodiments.

Hereinafter, the present disclosure will be described in detail. Prior to the description, it should be understood that the terms or words used in the specification and the appended claims should not be construed as limited to general and dictionary meanings, but rather interpreted based on the meanings and concepts corresponding to the technical aspects of the present disclosure on the basis of the principle that the inventor is allowed to define terms appropriately for the best explanation. Therefore, the embodiments described herein and the elements shown in the drawings is just a most preferred embodiment of the present disclosure, but not intended to fully describe the technical aspects of the present disclosure, so it should be understood that other equivalents and modifications could have been made thereto at the time the application was filed.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The terms "about" and "essentially" are used herein in the sense of at, or nearly at, when given the manufacturing and material tolerances inherent in the stated circumstances and are used to prevent the unscrupulous infringer from unfairly taking advantage of the present disclosure where exact or absolute figures are stated as an aid to understanding the present disclosure.

"A and/or B" when used in this specification, specifies "either A or B or both".

As used herein, the terms proximal and distal in the context of the apparatus refer to proximal and distal as referenced from the apparatus outside an object, such that proximal may refer to components outside the object and distal may refer to components inside the object or attached to the object, or on a surface of the object.

The present disclosure recognizes that there's a growing demand for precision and speed in preparing and conducting lab work.

In some embodiments, the maintenance of the controlled environment may demand care and labor when handling samples. With the advancement of science and technology, the significance of preparatory work involving reagents and cleaning solutions in biology, chemistry, and other laboratory settings is increasingly recognized. Consequently, there's a growing demand for precision and speed in in laboratory work such as preparing and replacing solutions.

In some embodiments, an automated system or solution for laboratory work can be provided. In some embodiments, automating the entire bio or chemistry lab such as a cell culture process including, cell isolation or purification, cell proliferation, and preservation, and aiming to reduce manual labor in a laboratory or a factory can be provided.

In some embodiments, AI-based feedback check can be implemented. In some embodiments, AI image analysis will be employed to perform the precision of the bag replacement process and to provide real-time system feedback. In some embodiments, a database to log operational data for monitoring and improving system performance can be implemented.

The present disclosure relates to a system including a lab space housing multiple workstations including at least two workstations each performing a different type of bio lab task from another, wherein the lab space has a lab floor space including an occupied lab floor space on which the multiple workstations are occupied, and an unoccupied lab floor space on which a stand-alone robotic arm moves through, wherein the stand-alone robotic arm includes visual assistance to determine a move path on the unoccupied lab floor space for the stand-alone robotic arm to move to or among the multiple workstations, and wherein the visual assistance assists the stand-alone robotic arm to be positioned at each of the multiple workstations depending on the bio lab task to be performed.

In some embodiments, the stand-alone robotic arm is not attached to any of the multiple workstations.

In some embodiments, the lab floor space does not include a track on which robotic arm moves. In some embodiments, the lab floor space includes a track on which robotic arm moves.

In some embodiments, the visual assistance visualizes the path and modify the path depending on the relative positions of the multiple workstations. In some embodiments, the visual assistance visualizes the path and modify the path depending on the shapes of the multiple workstations. In some embodiments, the visual assistance visualizes the path and modify the path depending on the relative positions of obstacles unrelated to the multiple workstations.

In some embodiments, no more than about 80% of the lab floor space is unoccupied. In some embodiments, no more than about 75% of the lab floor space is unoccupied. In some embodiments, no more than about 70% of the lab floor space is unoccupied. In some embodiments, no more than about 65% of the lab floor space is unoccupied. In some embodiments, no more than about 60% of the lab floor space is unoccupied. In some embodiments, no more than about 55% of the lab floor space is unoccupied. In some embodiments, no more than about 50% of the lab floor space is unoccupied. In some embodiments, no more than about 45% of the lab floor space is unoccupied. In some embodiments, no more than about 40% of the lab floor space is unoccupied. In some embodiments, no more than about 35% of the lab floor space is unoccupied. In some embodiments, no more than about 30% of the lab floor space is unoccupied. In some embodiments, no more than about 25% of the lab floor space is unoccupied. In some embodiments, no more than about 20% of the lab floor space is unoccupied. In some embodiments, no more than about 15% of the lab floor space is unoccupied. In some embodiments, no more than about 10% of the lab floor space is unoccupied. In some embodiments, no more than about 5% of the lab floor space is unoccupied.

In some embodiments, the stand-alone robotic arm increases a process time of the system based on the multiple workstations by at least about 2 times. In some embodiments, the stand-alone robotic arm increases a process time of the system based on the multiple workstations by at least about 3 times. In some embodiments, the stand-alone robotic arm increases a process time of the system based on the multiple workstations by at least about 5 times. In some embodiments, the stand-alone robotic arm increases a process time of the system based on the multiple workstations by at least about 10 times. In some embodiments, the stand-alone robotic arm increases a process time of the system based on the multiple workstations by at least about 15 times. In some embodiments, the stand-alone robotic arm increases a process time of the system based on the multiple workstations by at least about 20 times. In some embodiments, the stand-alone robotic arm increases a process time of the system based on the multiple workstations by at least about 30 times. In some embodiments, the stand-alone robotic arm increases a process time of the system based on the multiple workstations by at least about 40 times. In some embodiments, the stand-alone robotic arm increases a process time of the system based on the multiple workstations by at least about 50 times. In some embodiments, the stand-alone robotic arm increases a process time of the system based on the multiple workstations by at least about 60 times. In some embodiments, the stand-alone robotic arm increases a process time of the system based on the multiple workstations by at least about 62 times.

In some embodiments, the stand-alone robotic arm includes a controller that controls the movement of the stand-alone robotic arm to perform tasks on multiple workstations, and wherein visualization assistance is operationally associated with the controller to assist the stand-alone robotic arm to perform tasks. In some embodiments, visualization assistance visualizes a functional object on the workstation and assists the stand-alone robotic arm to move toward and manipulate the functional object. In some embodiments, visualization assistance visualizes a functional object on the workstation and assists the stand-alone robotic arm to grab the functional object. In some embodiments, visualization assistance visualizes a functional object on the workstation and assists the stand-alone robotic arm to contact the functional object. In some embodiments, visualization assistance visualizes a functional object on the workstation and assists the stand-alone robotic arm to transfer the functional object from one location to another location. In some embodiments, visualization assistance visualizes a functional object on the workstation and assists the stand-alone robotic arm to rub the functional object. In some embodiments, visualization assistance visualizes a functional object on the workstation and assists the stand-alone robotic arm to actuate a switch on the functional object. In some embodiments, visualization assistance visualizes a functional object on the workstation and assists the stand-alone robotic arm to push a button on a functional object. In some embodiments, visualization assistance visualizes a functional object on the workstation and assists the stand-alone robotic arm to touch a touch screen.

In some embodiments, the stand-alone robotic arm includes a controller that controls the movement of the stand-alone robotic arm to perform tasks on multiple workstations, and wherein visualization assistance is operationally associated with the controller to assist the stand-alone robotic arm to move toward and manipulate the functional object. In some embodiments, the stand-alone robotic arm includes a controller that controls the movement of the stand-alone robotic arm to perform tasks on multiple workstations, and wherein visualization assistance is operationally associated with the controller to assist the stand-alone robotic arm to grab the functional object. In some embodiments, the stand-alone robotic arm includes a controller that controls the movement of the stand-alone robotic arm to perform tasks on multiple workstations, and wherein visualization assistance is operationally associated with the controller to assist the stand-alone robotic arm to contact the functional object. In some embodiments, the stand-alone robotic arm includes a controller that controls the movement of the stand-alone robotic arm to perform tasks on multiple workstations, and wherein visualization assistance is operationally associated with the controller to assist the stand-alone robotic arm to transfer the functional object from one location to another location. In some embodiments, the stand-alone robotic arm includes a controller that controls the movement of the stand-alone robotic arm to perform tasks on multiple workstations, and wherein visualization assistance is operationally associated with the controller to assist the stand-alone robotic arm to rub the functional object. In some embodiments, the stand-alone robotic arm includes a controller that controls the movement of the stand-alone robotic arm to perform tasks on multiple workstations, and wherein visualization assistance is operationally associated with the controller to assist the stand-alone robotic arm to actuate a switch on the functional object. In some embodiments, the stand-alone robotic arm includes a controller that controls the movement of the stand-alone robotic arm to perform tasks on multiple workstations, and wherein visualization assistance is operationally associated with the controller to assist the stand-alone robotic arm to push a button on a functional object. In some embodiments, the stand-alone robotic arm includes a controller that controls the movement of the stand-alone robotic arm to perform tasks on multiple workstations, and wherein visualization assistance is operationally associated with the controller to assist the stand-alone robotic arm to touch a touch screen.

In some embodiments, the visualization assistance further visualizes the failure of moving toward the functional object and inform the controller to adjust the movement of the stand-alone robotic arm. In some embodiments, the visualization assistance further visualizes a failure of manipulating the functional object and inform the controller to adjust the movement of the stand-alone robotic arm to adjust manipulating the functional object. In some embodiments, the visualization assistance further visualizes an obstructing object obstructing the stand-alone robotic arm from manipulating the functional object and inform the controller to adjust the movement of the stand-alone robotic arm to adjust manipulating the functional object. In some embodiments, the visualization assistance further visualizes a failure of going around an object and inform the controller to adjust the movement of the stand-alone robotic arm to adjust manipulating the functional object. In some embodiments, the visualization assistance further visualizes a failure of manipulating the functional object and inform the controller to adjust the movement of the stand-alone robotic arm to adjust manipulating the functional object. In some embodiments, the visualization assistance further visualizes a failure of grabbing the functional object and inform the controller to adjust the movement of the stand-alone robotic arm to adjust grabbing the functional object. In some embodiments, the visualization assistance further visualizes a failure of contacting the functional object and inform the controller to adjust the movement of the stand-alone robotic arm to adjust contacting the functional object. In some embodiments, the visualization assistance further visualizes a failure of transferring the functional object from one location to another and inform the controller to adjust the movement of the stand-alone robotic arm to adjust transferring the functional object. In some embodiments, the visualization assistance further visualizes a failure of rubbing the functional object and inform the controller to adjust the movement of the stand-alone robotic arm to adjust rubbing the functional object. In some embodiments, the visualization assistance further visualizes a failure of actuating the switch on the functional object and inform the controller to adjust the movement of the stand-alone robotic arm to adjust actuating the switch the functional object. In some embodiments, the visualization assistance further visualizes a failure of touching the touch screen from one location to another and inform the controller to adjust the movement of the stand-alone robotic arm to adjust touching the touch screen.

In some embodiments, the visualization assistance includes a sensor. In some embodiments, the visualization assistance includes a 3D sensor. In some embodiments, the visualization assistance includes a camera. In some embodiments, the visualization assistance includes a 3D camera. In some embodiments, the visualization assistance includes a LiDAR sensor. In some embodiments, the visualization assistance includes a laser sensor. In some embodiments, the visualization assistance includes a UV light sensor. In some embodiments, the visualization assistance includes an infrared sensor. In some embodiments, the visualization assistance includes a point cloud sensor. In some embodiments, the visualization assistance includes a laser scanning sensor. In some embodiments, the visualization assistance includes an electromagnetic wave scanner. In some embodiments, the visualization assistance includes a Time-of-Flight (ToF) Sensor. In some embodiments, the visualization assistance includes a Dual lens camera. In some embodiments, the visualization assistance includes a structured-light 3D scanner.

In some embodiments, the multiple workstations include a patient tissue processing station. In some embodiments, the multiple workstations include a cell enrichment station. In some embodiments, the multiple workstations include a cell activation and/or cell transduction station. In some embodiments, the multiple workstations include a cell proliferation or expansion station. In some embodiments, the multiple workstations include a cell enrichment station. In some embodiments, the multiple workstations include a cell purification and formulation station. In some embodiments, the multiple workstations include a cell cryopreservation station. In some embodiments, the multiple workstations include a pre-process station.

In some embodiments, the multiple workstations include a station to perform homogenization, isolation, washing, removal, depletion, separation, filtration, pre-treatment, enzymatic treatment, selection, or cryopreservation, or any combination thereof. In some embodiments, the multiple workstations include a cell selection station. In some embodiments, the multiple workstations include a station to perform enrichment, isolation, separation, purification, collection, sorting, cumulating, capture, depletion, removal, separation, or any combination thereof. In some embodiments, the multiple workstations include a non-genetic manipulation station. In some embodiments, the multiple workstations include a non-genetic manipulation station to perform activation, stimulation, enhancing, promotion, booster, seeding, inoculation, recovery, attachment, or any combination thereof. In some embodiments, the multiple workstations include a gene modification station. In some embodiments, the multiple workstations include a station to perform transduction, electroporation, nucleofection, transfection, modification, delivery, genetic engineering, genetic editing, cell squeezing, infusion, microinjection, cargo loading, or any combination thereof. In some embodiments, the multiple workstations include an expansion station. In some embodiments, the multiple workstations include a station to perform proliferation, culture, production, growth, or any combination thereof. In some embodiments, the multiple workstations include a formulation and filling station. In some embodiments, the multiple workstations include a station to perform reconstitution, concentration, aliquot, or any combination thereof. In some embodiments, the multiple workstations include a cryopreservation station. In some embodiments, the multiple workstations include a station to perform cell freezing.

In some embodiments, the system operates based on a computer-implemented method including: obtaining a three dimensional map of a bio lab environment; assigning locations of the multiple workstations for interactions by the stand-alone robotic arm; generating a plurality of waypoints corresponding to the multiple workstations, using a machine learning model and based on the three dimensional map of the bio lab environment and the locations of the multiple workstations the interaction point; generating operation data from monitoring operation of the robotic device to control the multiple workstations operated based on the plurality of waypoints; and feeding back the generated operation data to the machine learning model to generate an updated plurality of waypoints corresponding to the multiple workstations.

In some embodiments, localization can be performed to localize a machine or a conduct unit operation for a machine, wherein the localization can be any perception in general, which may include computer imaging, computer vision, sensing, sound and other medium for perception.

In some aspects, the techniques described herein relate to a method of deploying a robotic device to manipulate at least one workstation associated with a biological process in a space, including: obtaining, by at least one hardware processor, description data associated with a three-dimensional (3D) model of the space, the data including first information corresponding to spatial arrangements of the at least one workstation and a plurality of objects associated with the at least one workstation, and second information corresponding to workflow of a process to control the at least one workstation using objects among the plurality of objects; assigning, by the at least one hardware processor, physical property attributes associated with properties of the plurality of objects, the physical property attributes including dynamic attributes, static attributes, at least one mass attribute, at least one force attribute, at least one torque attribute, and at least one elasticity attribute; assigning, by the at least one hardware processor, a plurality of unit operation attributes associated with unit operations to manipulate at least one object among the plurality of objects in sequence, to generate a process flow information to perform the process to control the at least one workstation, based on the first and second information; generating, utilizing a machine learning model executed by the at least one hardware processor, instructions to perform a plurality of movements of the robotic device associated with the unit operations in the 3D model of the space, based on the assigned physical property attributes or the generated process flow information associated with the assigned plurality of unit operations; controlling, based on the generated instructions, the robotic device to execute at least one physical movement associated with at least one generated movement among the plurality of movements in the space with respect to the plurality of the objects; and obtaining, by the at least one hardware processor, at least one discrepancy in a unit operation associated with the at least one executed physical movement among the unit operations.

In some aspects, the techniques described herein relate to a method of controlling a robotic device to manipulate at least one workstation associated with a biological process in a space, including: obtaining, by at least one hardware processor, description data associated with a three-dimensional (3D) model of the space, the data including first information corresponding to spatial arrangements of the at least one workstation designed to be directly operated by a human lab worker working in the space and a plurality of objects associated with the at least one workstation, and second information corresponding to workflow of a process to control the at least one workstation by the human lab worker using objects among the plurality of objects; assigning, by the at least one hardware processor, physical property attributes associated with properties of the plurality of objects, the physical property attributes including dynamic attributes, static attributes, at least one mass attribute, at least one force attribute, at least one torque attribute, and at least one elasticity attribute, wherein the dynamic attributes includes a dynamic attribute directly associated with an outcome of the biological process; assigning, by the at least one hardware processor, a plurality of unit operation attributes associated with unit operations to manipulate at least one object among the plurality of objects in sequence, to generate a process flow information to perform the process to control the at least one workstation, based on the first and second information; generating, utilizing a machine learning model executed by the at least one hardware processor, instructions to perform a plurality of movements of the robotic device associated with the unit operations in the 3D model of the space, based on the assigned physical property attributes or the generated process flow information associated with the assigned plurality of unit operations; controlling, based on the generated instructions, the robotic device to execute at least one physical movement associated with at least one generated movement among the plurality of movements in the space with respect to the plurality of the objects; and obtaining, by the at least one hardware processor, at least one discrepancy in a unit operation associated with the at least one executed physical movement among the unit operations.

In some aspects, the techniques described herein relate to a method of controlling a robotic device to manipulate at least one workstation including a plurality of workstations associated with a biological process in a space, including: obtaining, by at least one hardware processor, description data associated with a three-dimensional (3D) model of the space, the data including first information corresponding to spatial arrangements of the at least one workstation designed to be directly operated by a human lab worker working in the space including the plurality of workstations and a plurality of objects associated with the plurality of workstations, and second information corresponding to workflow of a process to control the at least one workstation by the human lab worker using objects among the plurality of objects; assigning, by the at least one hardware processor, physical property attributes associated with properties of the plurality of objects, the physical property attributes including dynamic attributes, static attributes, at least one mass attribute, at least one force attribute, at least one torque attribute, and at least one elasticity attribute; assigning, by the at least one hardware processor, a plurality of unit operation attributes associated with unit operations to manipulate at least one object among the plurality of objects in sequence, to generate a process flow information to perform the process to control the plurality of workstations, based on the first and second information; generating, utilizing a machine learning model executed by the at least one hardware processor, instructions to perform a plurality of movements of the robotic device associated with the unit operations in the 3D model of the space, based on the assigned physical property attributes or the generated process flow information associated with the assigned plurality of unit operations; controlling, based on the generated instructions, the robotic device to execute at least one physical movement associated with at least one generated movement among the plurality of movements in the space with respect to the plurality of the objects; and obtaining, by the at least one hardware processor, at least one discrepancy in a unit operation associated with the at least one executed physical movement among the unit operations.

In some aspects, the techniques described herein relate to a method of controlling a robotic device to manipulate at least one workstation including plurality of workstations associated with a biological process in a space, including: obtaining, by at least one hardware processor, description data associated with a three-dimensional (3D) model of the space, the data including first information corresponding to spatial arrangements of the at least one workstation designed to be directly operated by a human lab worker working in the space including a plurality of workstations and a plurality of objects associated with the plurality of workstations, and second information corresponding to workflow of a process to control the at least one workstation by the human lab worker using objects among the plurality of objects; assigning, by the at least one hardware processor, physical property attributes associated with properties of the plurality of objects, the physical property attributes including dynamic attributes, static attributes, at least one mass attribute, at least one force attribute, at least one torque attribute, and at least one elasticity attribute, wherein the dynamic attributes includes a dynamic attribute directly associated with an outcome of the biological process; assigning, by the at least one hardware processor, a plurality of unit operation attributes associated with unit operations to manipulate at least one object among the plurality of objects in sequence, to generate a process flow information to perform the process to control the plurality of workstations, based on the first and second information; generating, utilizing a machine learning model executed by the at least one hardware processor, instructions to perform a plurality of movements of the robotic device associated with the unit operations in the 3D model of the space, based on the assigned physical property attributes or the generated process flow information associated with the assigned plurality of unit operations; controlling, based on the generated instructions, the robotic device to execute at least one physical movement associated with at least one generated movement among the plurality of movements in the space with respect to the plurality of the objects; and obtaining, by the at least one hardware processor, at least one discrepancy in a unit operation associated with the at least one executed physical movement among the unit operations.

In some aspects, the techniques described herein relate to a method, wherein instructions to perform a plurality of movements of the robotic device includes a movement to couple the robotic device with an end module among a plurality of end modules configured to interact with the plurality of objects.

In some aspects, the techniques described herein relate to a method, wherein instructions to perform a plurality of movements, of the robotic device includes a movement of the robotic device to switch from one end module to another end module among a plurality of end modules configured to interact with the plurality of objects.

In some aspects, the techniques described herein relate to a method, wherein the plurality of end modules includes a module to interact with a deformable object or a flexible bag, a module to interact with a housing containing the deformable object or the flexible bag, a module to interact with a touch screen, a module to interact with a switch, and a module to interact with a tube connected to the flexible bag.

In some aspects, the techniques described herein relate to a method, wherein the plurality of end modules includes a mechanical tool couplable to the robotic device.

In some aspects, the techniques described herein relate to a method, wherein at least one of the plurality of objects is configured to be operated by a human lab worker.

In some aspects, the techniques described herein relate to a method, wherein the space is a space previously occupied by the lab worker.

In some aspects, the techniques described herein relate to a method, wherein the at least one workstation is designed to be directly operated by a human lab worker working in the space.

In some aspects, the techniques described herein relate to a method, wherein the at least one workstation is configured to be used by a human lab worker.

In some aspects, the techniques described herein relate to a method, wherein the method further includes rearranging the at least one workstation based on a moving path of the robotic device.

In some aspects, the techniques described herein relate to a method, wherein the method further includes modifying, by at least one hardware processor, at least one physical property attribute among the assigned physical property attributes based on the at least one discrepancy.

In some aspects, the techniques described herein relate to a method, wherein the method further includes modifying, by at least one hardware processor, at least one unit operation attribute among the assigned plurality of unit operation attributes based on the at least one discrepancy.

In some aspects, the techniques described herein relate to a method, wherein the method further includes modifying, by at least one hardware processor, the instructions to perform the plurality of movements of the robotic device associated with the unit operations in the 3D model of the space based on the at least one discrepancy.

In some aspects, the techniques described herein relate to a method, wherein the description data is generated based on 3D scanning of the space.

In some aspects, the techniques described herein relate to a method, wherein the description data is generated based on 3D scanning of the space using a scanning sensor.

In some aspects, the techniques described herein relate to a method, wherein the description data is generated based on 3D scanning of the space using a scanning sensor.

In some aspects, the techniques described herein relate to a method, wherein the description data is generated based on 3D scanning of the space using a scanning sensor, wherein the scanning sensor is one or more scanning sensors including a LiDAR, a depth camera, a standard cameras, a radar, a sonar, a light sensor, an infrared sensor, or any combination thereof.

In some aspects, the techniques described herein relate to a method, wherein the description data is generated based on processing of data generated based on the scanning sensor using a computer vision technique.

In some aspects, the techniques described herein relate to a method, wherein obtaining the description data includes generating the description data.

In some aspects, the techniques described herein relate to a method, wherein obtaining the description data includes importing the 3D model into CAD or simulation application.

In some aspects, the techniques described herein relate to a method, wherein obtaining the description data includes arranging the plurality of objects in the 3D model of the space.

In some aspects, the techniques described herein relate to a method, wherein the plurality of objects includes a bio reactor, a culturing device, a user interface, a display, automation equipment, a sensor, a control unit, an actuator, and an accessory associated with a unit operation among the plurality of unit operations.

In some aspects, the techniques described herein relate to a method, wherein the plurality of objects includes a portion of a bio reactor, a portion of a culturing device, a portion of a user interface, a portion of a display, a portion of automation equipment, a portion of a sensor, a portion of a control unit, a portion of an actuator, and a portion of an accessory associated with a unit operation among the plurality of unit operations.

In some aspects, the techniques described herein relate to a method, wherein obtaining the description data includes generating a digital representation of the space corresponding to the physical space.

In some aspects, the techniques described herein relate to a method, wherein obtaining the description data includes checking the accuracy of correspondences between the digital representation and the physical space.

In some aspects, the techniques described herein relate to a method, wherein obtaining the description data includes identifying a difference between the digital representation and the physical space and modifying the digital representation based on the difference.

In some aspects, the techniques described herein relate to a method, wherein obtaining the description data includes refining the digital representation.

In some aspects, the techniques described herein relate to a method, wherein obtaining the description data includes importing the 3D model into an advanced simulator to generate the second information.

In some aspects, the techniques described herein relate to a method, wherein obtaining the description data includes importing the 3D model into Isaac Sim application to generate the second information.

In some aspects, the techniques described herein relate to a method, wherein assigning the physical property attributes includes setting physical property values of the physical property attributes based on the properties of the plurality of objects.

In some aspects, the techniques described herein relate to a method, wherein assigning the physical property attributes includes testing physical property values of the physical property attributes based on the properties of the plurality of objects or law of physics.

In some aspects, the techniques described herein relate to a method, wherein assigning the plurality of unit operation attributes includes defining unit operations based on the plurality of objects.

In some aspects, the techniques described herein relate to a method, wherein the plurality of objects includes a device, a machine, a consumable, a product, or a combination thereof.

In some aspects, the techniques described herein relate to a method, wherein generating the process flow information includes generating an end-to-end sequence of unit operations among the plurality of unit operations.

In some aspects, the techniques described herein relate to a method, wherein generating the instructions to perform the plurality of movements of the robotic device includes using an artificial intelligence (AI) motion planning algorithm to generate a plurality of way points indicating movements of joints included in the robotic device.

In some aspects, the techniques described herein relate to a method, wherein generating the instructions to perform the plurality of movements of the robotic device includes using an artificial intelligence (AI) motion planning algorithm to generate a plurality of way points indicating movements of joints included in the robotic device to operate at one unit operation among the unit operations.

In some aspects, the techniques described herein relate to a method, wherein controlling the robotic device to execute the at least one physical movement includes deploying the at least one physical movement based on the generated process flow information in the physical space.

In some aspects, the techniques described herein relate to a method, wherein the method further includes assigning visual check point attributes to the plurality of objects for object localization in the space.

In some aspects, the techniques described herein relate to a method, wherein the method further includes assigning AprilTags as visual checkpoint attributes to the plurality of objects for object localization in the space.

In some aspects, the techniques described herein relate to a method, wherein the method further includes using the visual check point attributes to compensate for a positional or orientational error.

In some aspects, the techniques described herein relate to a method, wherein the method further includes generating and exporting automation program scripts based on the instructions.

FIG. 1 illustrates an example lab system involving a plurality of human laboratory workers or technicians that are generally or currently implemented in some embodiments. Referring to FIG. 1, the example laboratory system requires relatively mostly empty floor space for the human laboratory workers to move around to perform their tasks. Moreover, this floor space often needs to be merged to provide mostly common spaces, which could additionally limit the allocating other lab equipment. These requirements with a plurality of human workers often demand more floor spaces, which can be more than about 75 square meters or about 800 square feet. The number of technicians required to perform the tasks could be 5 people at a time. The processes and tasks performed by human workers can be relatively manual, expensive and low-throughput processes.

Figure 2A:
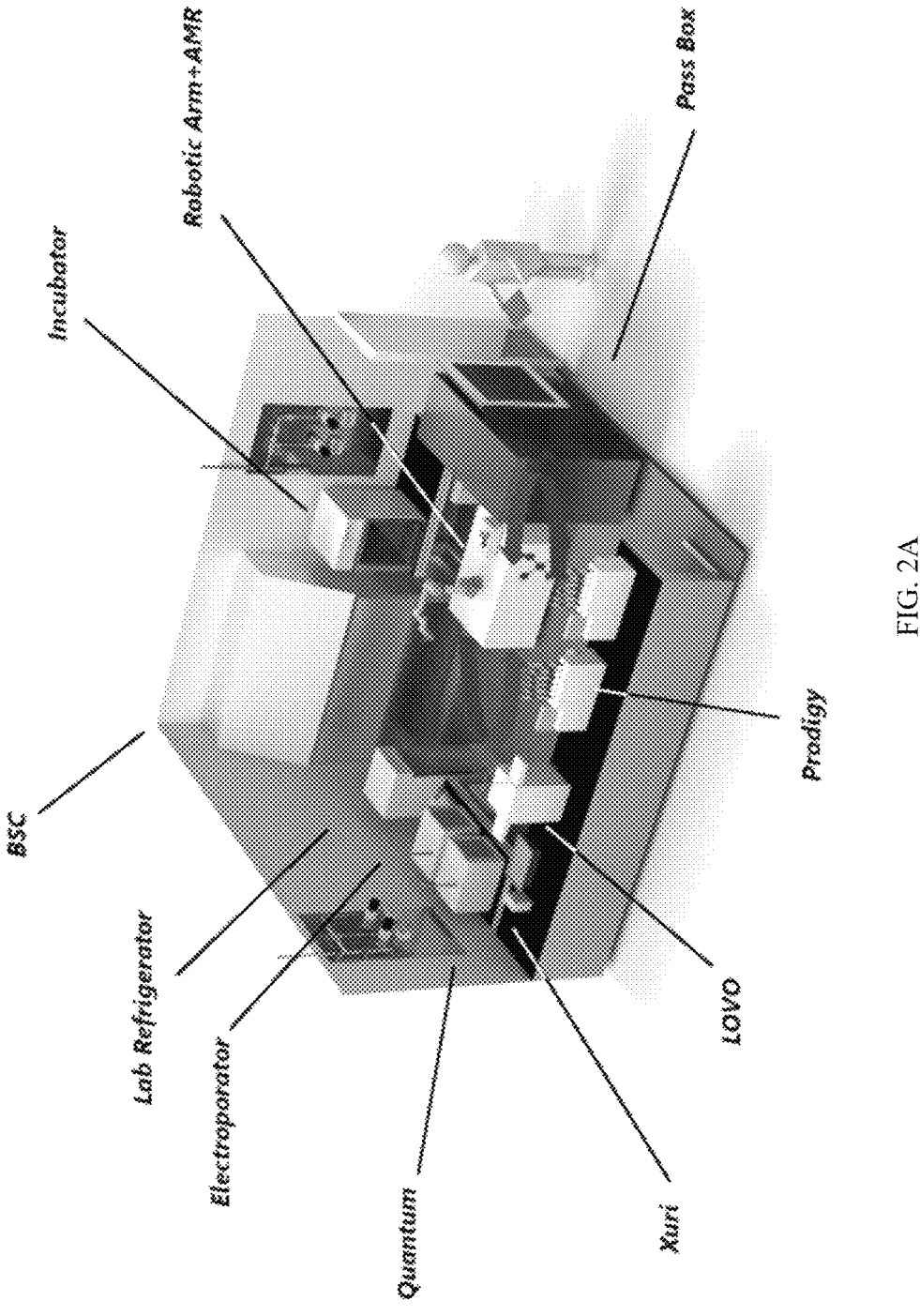
FIG. 2A illustrates an example artificial intelligence-based laboratory system that is at least substantially automated with an robotic arm combined with automated mobile robot in some embodiments.
Figure 2B:
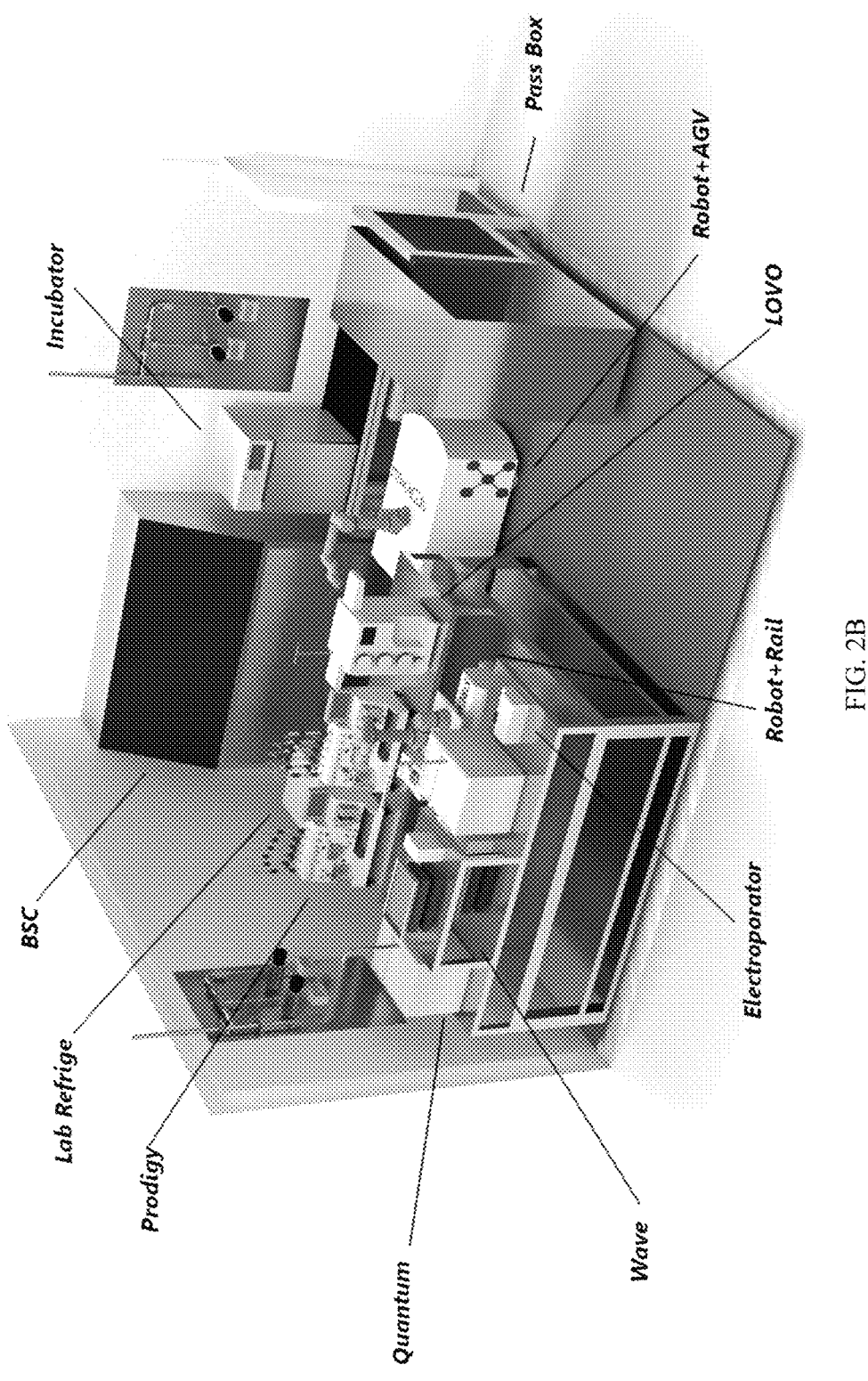
FIG. 2B illustrates an example artificial intelligence-based laboratory system that is at least substantially automated with robotics in some embodiments.

FIG. 2A illustrates an example artificial intelligence-based laboratory system that is at least substantially automated with an robotic arm combined with automated mobile robot in some embodiments. FIG. 2B illustrates an example artificial intelligence-based laboratory system that is at least substantially automated with robotics in some embodiments. Referring to FIGS. 2A and 2B, an example artificial intelligence-based laboratory system with a moving device such as a robotic arm with mobility can perform the processes or tasks that would require a plurality of human laboratory workers. The multi-functionality and mobility of the moving device requires substantially less floor space to perform the process or task that would require a plurality of human laboratory workers. In some embodiments, as shown in FIG. 1B, the system may include a plurality of moving devices being the robotics or a plurality of different types of moving devices. For example, the floor space required can be about 25 square meter or about 270 square feet. Moreover, the number of human workers can be reduced, such zero human workers. More number of workstations or laboratory devices can be fit in. Referring to FIG. 2, two CliniMACS Prodigy Platform, two Quantum, two Lovo, and 2 Wave were placed in the system, compared to one CliniMACS Prodigy Platform and one Lovo placed in FIG. 1. In some embodiments, artificial intelligence controlled robotic systems with real-time vision and motion planning in a human-free environment can be implemented. In some embodiments, the automation according to the present disclosure may enable relatively faster operation time than traditional laboratory performance by human workers, which can maximize cell viability or chemical stability by minimizing transition times such as cell transition time.

In some embodiment, an artificial intelligence controlled robotic system can scale up a corresponding operation such as a lab work and cell growth lab operations, e.g., due to the possibility of adding in a plurality of robotic system, which can be identical, similar, or different types of robotic systems. In comparison to scaling up conventional manufacturing and lab involving human workers with significantly more space and human resources requirements, operations based on an artificial intelligence controlled robotic system can be scaled up relatively more efficiently, for example, in terms of time and resources requirements. In some embodiments, using AI automation in manufacturing, bio labs, and cell growth labs can enhance efficiency, accuracy, and productivity. In some embodiments, maintenance of the operations can be more predictive. In some embodiments, AI algorithms can analyze data from machinery and equipment to predict maintenance needs before failures occur. In some embodiments, scaling up prevent costly downtime and extends equipment life, supporting larger production volumes with fewer disruptions. In some embodiments, AI-driven vision systems inspect products for defects and inconsistencies, can enhance the consistency and reliability of quality checks, ensuring high standards are maintained as production scales, or can increase production speed and consistency, enabling higher output without proportional increases in labor costs. In some embodiments, scaling up can streamline operations and reduces costs, supporting the efficient scaling of production processes. In some embodiments, in bio laboratory settings, scaling up can increase throughput and consistency, allowing bio labs to manage larger volumes of samples efficiently. In some embodiments, A scaled up AI-based robotics systems can monitor cell cultures in substantially real-time, assessing parameters such as growth and viability and can ensure optimal conditions for larger-scale cell cultures and improves consistency across multiple cultures. In some embodiments, AI-based system can automate the screening of compounds or conditions affecting cell growth. In some embodiments, scaling up can speed up the screening process, enabling the evaluation of larger numbers of compounds or conditions more efficiently.

Figure 3:
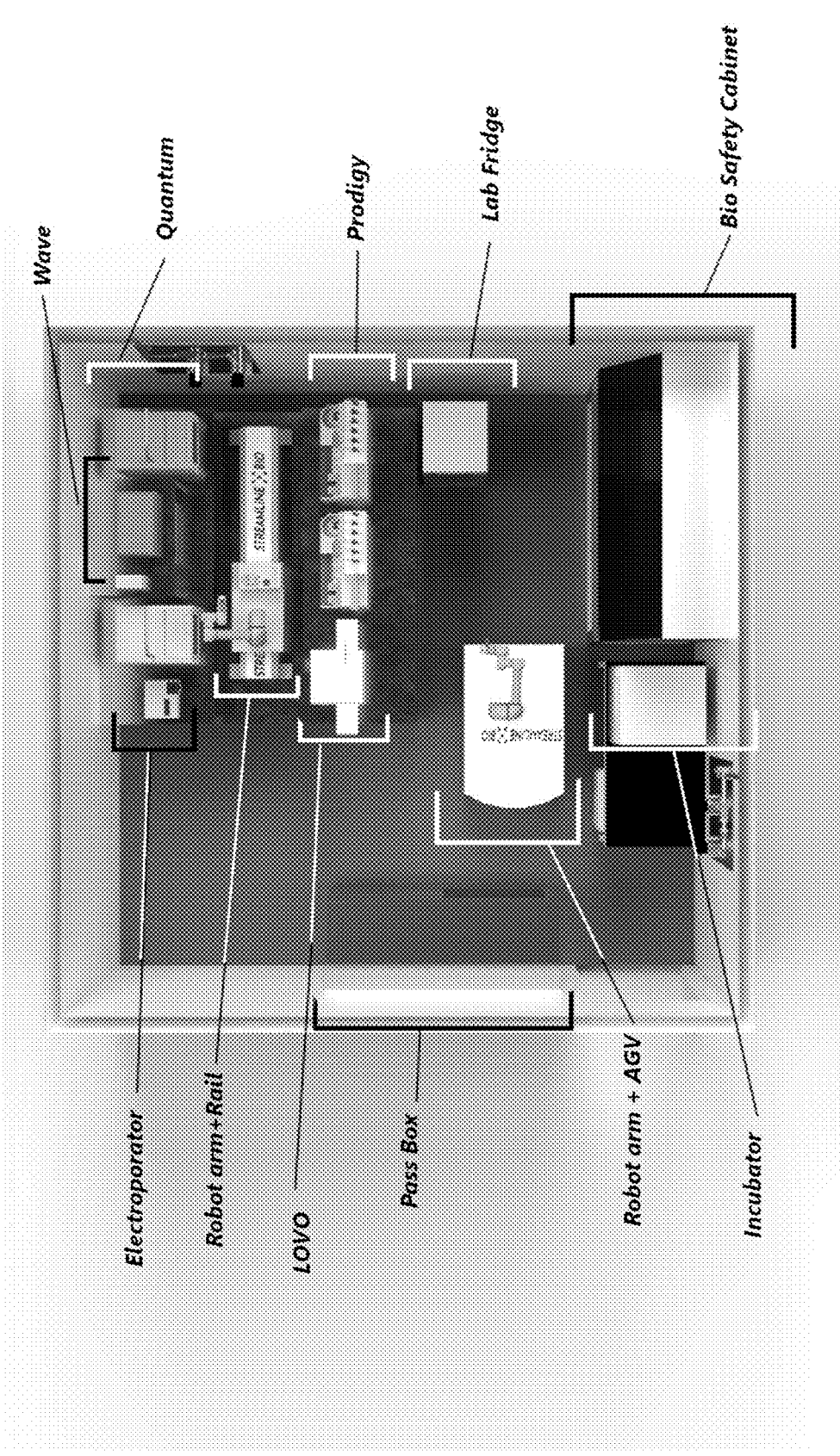
FIG. 3 illustrates an example artificial intelligence (AI)-based laboratory system that is at least substantially automated in some embodiments.

FIG. 3 illustrates an example artificial intelligence-based laboratory system that is at least substantially automated in some embodiments. Referring to FIG. 3, the artificial intelligence robotics system can be a substantially true plug-and-play. With computerized vision, the moving device as a robotic arm in FIG. 3 can perceive the surroundings or the environment by processing sensor data (e.g., camera, Lidar, Radar). The moving device recognizes the bioprocessing machines and contact points to perform unit operations in a predefined sequence.

In some embodiments, the moving device based on artificial intelligence can localize a given object and complete the unit operation, such as fetching an object in different orientations or positions, which can be applicable to localization in general. For example, in some embodiments, a cell culture machine or each contact point to complete unit operations can be localized.

In some embodiments, a moving device can include various types of mechanical structures and related control mechanism. For example, in some embodiments, a moving device may include a robotics-based structure such as a robotic arm. In some embodiments, the robotic arm can be UR 5c. In some embodiments, the robotic arm can have an attaching member which may include an attaching structure module. In some embodiments, an attaching structure module can be in various shapes and structures, such as a cube shape. In some embodiments, the robotic arm can move an object with a precise control.

Figure 4:
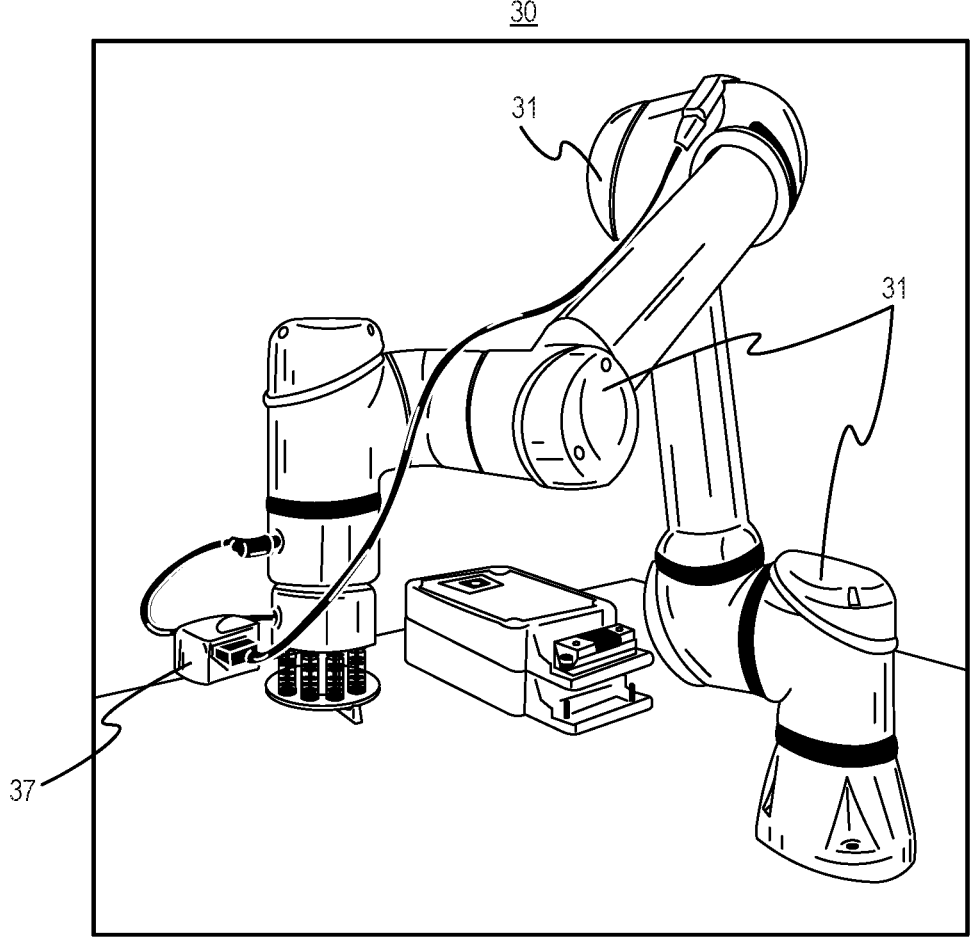
FIG. 4 illustrates an aspect of an example robotic arm as a moving device in some embodiments.

For example, FIG. 4 illustrates an aspect of an example robotic arm 30 as a moving device 30 in some embodiments. Referring to FIG. 4, in some embodiments, the robotic arm 30 may include a plurality of joints 31 to allow a different degree of freedom of motion. In some embodiments, the robotic arm 30 has at least two degrees of freedom. In some embodiments, the robotic arm 30 has at least three degrees of freedom. In some embodiments, the robotic arm 30 has at least four degrees of freedom. In some embodiments, the robotic arm 30 has at least five degrees of freedom. In some embodiments, the robotic arm 30 has at least six degrees of freedom. In some embodiments, the robotic arm 30 has at least seven degrees of freedom. In some embodiments, the robotic arm 30 has at least eight degrees of freedom. In some embodiments, the robotic arm 30 has at least nine degrees of freedom. In some embodiments, the robotic arm 30 has at least ten degrees of freedom.

In some embodiments, the robotic arm 30 can include a sensor 37, which could be selected from a various type of sensors, such as a camera. For example, in some embodiments, as a sensor 37, different types of cameras, such as 2D camera or 3D camera can be used. In some embodiments, various types of sensors can be implemented, such as a camera, LiDAR, Radar, UV light sensor, Infrared sensor, point cloud sensor, laser scanning sensor, electromagnetic wave scanner, Time-of-Flight (ToF) Sensor, a dual lens camera, a structured-light 3D scanner, etc. In some embodiments, the sensor 37 can obtain various information from the surrounding it is sensing and process the various information for operation of the robotic arm 30. For example, in some embodiments, the sensor 37 can obtain various information from the surrounding it is sensing and process the various information to determine an orientation of an object 11 a distance between the sensor 37 and an object 11.

In some embodiments, the sensor 37 is to obtain various types of information such as written codes, indicators, or characteristics and appearance of a physical object or matter. For example, the sensor 37 may obtain information from a solid, liquid, or gas. In some embodiments, the information can include color, temperature, pH, oxygenation status, or any combination thereof. In some embodiments, the information can comprise a computer-readable indicator, and the sensor can read information from the computer-readable indicator. In some embodiments, the computer-readable indicator may include a computer readable code. In some embodiments, the computer readable code can include AprilTag, bar code, or a QR code. In some embodiments, the information from the computer-readable indicator is to be processed to determine an orientation of an object.

In some embodiments, the multiple workstations include a patient tissue processing station. In some embodiments, the multiple workstations include a cell enrichment station. In some embodiments, the multiple workstations include a cell activation and/or cell transduction station. In some embodiments, the multiple workstations include a cell proliferation or expansion station. In some embodiments, the multiple workstations include a cell enrichment station. In some embodiments, the multiple workstations include a cell purification and formulation station. In some embodiments, the multiple workstations include a cell cryopreservation station.

In some embodiments, a manufacturing process for a cell therapy product can be categorized into a pre-process process, a selection process, a non-genetic manipulation process of gene expression, a gene modification process, an expansion process, a harvest process, a formulation of filling process, and a preservation process.

In some embodiments, in a pre-process process, cell therapy products can be derived from human tissues, including peripheral blood, certain organs, connective tissue, bone marrow, dental pulp, umbilical cord, amniotic fluid, placenta, and umbilical cord blood. Because human tissues contain a mixture of various cell types and extracellular matrix (ECM), initial tissues require a preliminary processing step to remove most unwanted cell types and ECM. Depending on the clinical administration strategy for different cell therapy products, if short-term storage of the pre-processed starting material is necessary, the processed starting materials need to undergo cryopreservation and be stored in the vapor phase of liquid nitrogen. In some embodiments, outcomes of a pre-process process may include generating a standardized, homogeneous starting material derived from human tissues, optimized for efficient downstream cell therapy manufacturing. In some embodiments, critical quality attributes (CQAs) can include safety, impurity, identity, quantity, etc. In some embodiments, a pre-process process can include homogenization, isolation, washing, removal, depletion, separation, filtration, pre-treatment, enzymatic treatment, selection, cryopreservation, etc.

In some embodiments, in a selection process, to guarantee that a desirably high purity of the target cell type is utilized during production, the starting materials undergo a critical selection process before manufacturing begins. This step is vital as it significantly increases the proportion of target cells in the starting materials while eliminating unwanted cell types. By ensuring higher purity of the starting materials, the selection process not only enhances the efficiency of the product manufacturing process but also plays a crucial role in the overall success of the therapy. This selection step is especially important for genetically modified cell products, where the precision and purity of the cell population directly impact the efficacy and safety of the final therapeutic product. Ensuring the correct cell type is selected is fundamental to achieving the desired therapeutic outcomes in cell therapy. In some embodiments, outcomes of a selection process may include enhancing the purity of the target cell population while minimizing the proportion of unwanted cell types. In some embodiments, critical quality attributes (CQAs) can include impurity, identity, quantity, potency, etc. In some embodiments, a selection process can include enrichment, isolation, separation, purification, collection, sorting, cumulating, capture, depletion, removal, separation, etc.

In some embodiments, in a non-genetic manipulation of gene expression process, some cell types require priming or pre-conditioning to prepare them for further processing or to improve their quality and function. Common priming or pre-conditioning methods include using cytokines, alloantigens, recombinant proteins, small molecule drugs, or culturing cells under hypoxic conditions. This step is crucial for enhancing the effectiveness and quality of the final cell therapy product. Additionally, gene expression in target cells can be modulated without altering their DNA. Non-genetic methods such as epigenetic control, mRNA, minicircle DNA, and pre-conditioning techniques can adjust gene activity, optimizing cells for therapeutic purposes without involving direct genetic engineering. In some embodiments, outcomes of a non-genetic manipulation of gene expression process may include modulating target cell properties through optimized culture conditions, without genetic modification, to prepare them for subsequent manipulation. In some embodiments, critical quality attributes (CQAs) can include impurity, identity, quantity, potency, etc. In some embodiments, a non-genetic manipulation of gene expression process can include activation, stimulation, enhancing, promotion, booster, seeding, inoculation, recovery, attachment, etc.

In some embodiments, gene modification in cell therapy involves altering the genetic material of cells to boost their therapeutic potential. This approach is often used to provide cells with new or enhanced capabilities to treat diseases, especially when their natural functions are inadequate for effective therapy. The two most common forms of gene modification are gene editing, which precisely alters existing DNA sequences, and the insertion of target DNA sequences to introduce new functions or correct genetic defects In some embodiments, outcomes of a gene modification process may include modulating the expression of one or more genes of the target cells, either permanently or transiently, using biotechnology. In some embodiments, critical quality attributes (CQAs) can include safety, identify, potency, etc. In some embodiments, a gene modification process can include transduction, electroporation, nucleofection, transfection, modification, delivery, genetic engineering, genetic editing, cell squeezing, infusion, microinjection, cargo loading, etc.

In some embodiments, in an expansion process, to produce a sufficient quantity of cell therapy products, an ex vivo expansion process lasting approximately 5 to 30 days is necessary. The culture medium used is carefully selected based on the specific type of cells being expanded, and the timing for replacing or supplementing the medium is adjusted according to the metabolic needs of the cells. In some embodiments, outcomes of an expansion process may include increasing the absolute number of the target cell type. In some embodiments, critical quality attributes (CQAs) can include quantity, identity, etc. In some embodiments, an expansion process can include proliferation, culture, production, growth, etc.

In some embodiments, in a harvest process, after ex vivo expansion, the cells are collected, and non-cellular impurities are removed. For adherent cells, enzymatic treatment is used to detach them from the surface of culture vessels. The harvested cells can either be directly formulated or cryopreserved in liquid nitrogen for future use. In some embodiments, outcomes of a harvest process may include isolating and purifying the target cell type, removing impurities, for subsequent storage or formulation. In some embodiments, critical quality attributes (CQAs) can include safety, impurity, identity, quantity, etc. in some embodiments, a harvest process can include washing, removal, sorting, collection, selection, filtration, etc.

In some embodiments, in a formulation and filling process, for clinical applications and to ensure cell viability, cell products must be reconstituted in an appropriate excipient before administration. The volume and cell concentration used during administration can significantly impact therapeutic efficacy. Therefore, during the excipient addition process, the cell concentration is carefully adjusted to the optimal range. For cell therapy products intended for long-term transport or temporary storage, a cryoprotectant is used as the excipient, and the formulated product is stored in the vapor phase of liquid nitrogen. In some embodiments, outcomes of a formulation and filling process may include that the target cell type is aliquoted into its final dosage form for administration to patients. In some embodiments, critical quality attributes (CQAs) can include safety, impurity, potency, etc. In some embodiments, a formulation and filling process can include reconstitution, concentration, aliquot, etc.

In some embodiments, in a preservation process such as a cryopreservation, some cell therapy products are designed for long-distance transportation or long-term storage. After the harvesting process is completed, these products undergo a controlled-rate freezing procedure. This ensures that the cells freeze with minimal impact on their viability, and they are then stored in the vapor phase of liquid nitrogen. Certain cell types do not require formulation and filling into clinical application containers. Instead, they can be thawed and injected directly into patients. In these situations, the cryopreservation and formulation steps are combined into a single step. In some embodiments, outcomes of a preservation process such as a cryopreservation may include that the target cell type is stably preserved in an appropriate cryoprotectant. In some embodiments, critical quality attributes (CQAs) can include safety, impurity, potency, etc. In some embodiments, a preservation process such as a cryopreservation can include frozen specimens.

The present disclosure relates to robotics data and machine learning that can be used to train a machine learning algorithm, and any type of data such as robotics data known in the relevant art, such as described herein, can be used. In some embodiments, additional parameters can include profiles, such as the radius, angle and longitudinal position of an object. This can be combined with real time imaging from a sensor for a moving device. In some embodiments, images can be processed with image segmentation, for example, to determine a location of an object or its structure. In some embodiments, artificial intelligence software instructions can be configured to automatically identify the structures and different devices and components and determine the relative locations of each. The data can be vectorized and input into the machine learning classifier, for example.

In some embodiments, moving devices for laboratory work and tasks often necessitate the coordination of multiple mechanical arms during the liquid preparation process. However, the intricate movement trajectories of these arms frequently lead to collisions and other complications, resulting in a cumbersome experimental process, elevated costs, and a low level of automation.

The present disclosure is related to robotics data and machine learning that can be used to train a machine learning algorithm, and any type of data and robotics data as described herein can be used. In some embodiments, this can be combined with sensor data such as imaging including real time imaging from the imaging devices. In some embodiments, the images may comprise a portion of the laboratory platform described herein. In some embodiments, the images can be processed with image segmentation, for example, to determine the location of an object. The artificial intelligence software instructions can be configured to automatically identify structure or arrangements of different equipment or objects. The data can be vectorized and input into the machine learning classifier, for example.

In some embodiments, devices, kits, systems and methods disclosed herein may comprise a sensor or detector such as a plurality of sensors, each of which is capable of measuring and recording states of various systems and objects such as the robotic system components, which can be used for analysis to improve the automated procedures and outcomes. For example, the robotics system may comprise a plurality of parameters related to the state of the system and associated components, such as an angle of a shaft, a longitudinal position of a shaft, data related to energy used to an object, real time imaging for example. In some embodiments, data during a process can be recorded in real time and used to generate a plurality of data frames corresponding to the state of the robotics system throughout the process. The data frames may correspond to fixed time intervals between frames, e.g. one second, in order to provide input data suitable for processing with machine learning or artificial intelligence as described herein.

In some embodiments, input data can be generated and recorded from or for many types of systems. The presently disclosed methods and apparatus are well suited for combination with many applications related to robotics, and can incorporate the hardware, processors and software of many prior systems.

In some embodiments, the processor, controller and control electronics and circuitry can include one or more of many suitable components, such as one or more processor, one or more field-programmable gate array (FPGA), and one or more memory storage devices. In many embodiments, the control electronics controls the control panel of the graphic user interface (hereinafter "GUI") to provide for, for example, a process planning.

In some embodiments, the sensor data, position data, and recorded treatment positions may comprise any of the sensor data, position data, and recorded treatment positions as described herein. The recorded data may comprise data of locations, status, and various properties, the light source, the arm lock, the arm controller, the linkage, each of the angle sensors, the patient support, or the base, for example.

In some embodiments, the data may comprise priming data, docking data, angle data, scale data, calibration data, cut profile data, corresponding times of one or more of these, and planned treatment time, for example.

In some embodiments, the data can be modified with the artificial intelligence or machine learning as described herein.

A method of locating and moving an object can be provided in some embodiments, such as those involving artificial intelligence, machine training or deep learning. While the method can be performed in many ways, in some embodiments, the robotics data comprises a plurality of parameters recorded during the process, a process time, a set up time, an imaging time, a time a sensor moves and reads, a plurality of locations and orientations of an object and robotic arm, a plurality of images FIG. 5 illustrates an example method of operations of a moving device for locating and manipulating an object in some embodiments.

Referring to FIG. 5, at a step 101, Various types of data related to operating the moving device such as location coordinates and different parameters such as temperature are recorded. For example, in some movements, set up data related to the process or operation of robotic arm can be recorded. In some embodiments, different statuses, conditions, or parameters of the process such as a cell culture can be recorded. In some embodiments, sensor data and data related to one or more robotic components can be recorded. In some embodiments, the data corresponding to each of the plurality of images can be recorded. In some embodiments, data frames can be generated from various types of data, such as the plurality of images and sensor data and other operating data. In some embodiments, the data frames may comprise image frames corresponding to fixed intervals, such as one second between frames. In some embodiments, Alternatively or in combination vectorized data can be generated from the image frames.

At a step 102, artificial intelligence processor instructions or a machine learning classifier can be trained in response to recorded data such as data in step 101. In some embodiments, artificial intelligence processor instructions may comprise one or more of machine learning, search and mathematical optimization, artificial neural networks, statistics, probability, support vector machine learning, clustering of data groups, image classification, image segmentation. In some embodiments, the machine learning processor instructions may comprise one or more of decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule based machine learning or a learning classifier system.

At a step 103, the trained artificial intelligence or trained machine learning classifier can be validated.

At a step 104, data for operation is input into trained artificial intelligence or trained machine learning classifier.

At a step 105, information input for operation can be input into trained artificial intelligence or machine learning classifier.

At a step 106, data or parameters are recorded or updated related to a moving device operation during the operation of the moving device, input into the processor of the robotic system involving the moving device.

At a step 107, the trained artificial intelligence or trained machine learning classifier is updated in response to data or parameters that are recorded or updated.

One or more steps of the artificial intelligence-based method may be performed with circuitry or processor instructions as described herein, for example, one or more of a processor or a logic circuitry of the systems described herein. The circuitry may be programmed to provide one or more steps 101 through 107, and the program may comprise program instructions stored on a computer readable memory or programmed steps of the logic circuitry such as with programmable array logic or a field programmable gate array, for example.

In some embodiments, traditional systems frequently depend on data produced through physical interactions within real-world environments to train neural networks before their implementation in operational models, which can have certain drawbacks. For instance, evaluating neural networks in actual environments may prove inefficient or impractical due to the resources required for extensive testing and the data collected that pertains to specific environments, spaces, and surroundings. In some embodiments, training, testing, and validating automated machines, such as moving devices, may occur within simulated environments. In some embodiments, systems and methods may be employed for training, testing, and/or validating various aspects of a real-world system—such as a software stack utilized in robotics for automating laboratory tasks, including bio-based experiments and processing.

In some embodiments, the systems outlined in this disclosure can leverage a simulated environment to assess one or more automated lab software stacks that integrate multiple neural networks. In some embodiments, physical sensor data, virtual sensor data, or a combination thereof can be utilized to train the neural networks within the software stack(s). In some embodiments, once trained, these neural networks can be evaluated, verified, and validated within a simulation framework that generates an environment for controlling a virtual object using the software stack(s). In some embodiments, simulation data produced from this environment may be fed into the neural networks, which subsequently generate outputs. In some embodiments, these outputs can either direct the virtual object within the simulated environment, testing its performance across various scenarios, or be employed to assess the neural networks' accuracy. In some embodiments, the outcomes can guide the creation of additional data for further training-specifically focusing on scenarios where the neural networks exhibit inconsistencies-facilitating fine-tuning, verification, and validation of the networks. In some embodiments, the simulated environment is designed to mimic complex, erroneous, or unpredictable situations, enabling the evaluation of scenarios that may be challenging or unsafe to replicate in reality. In some embodiments, the simulated environment can be derived from physical scans of the corresponding real-world environment.

In some embodiments, hardware configured for automated lab operations based on one or more moving devices may be utilized to execute the software stacks within the simulated environment. In some embodiments, the virtual sensor data can be formatted to align with the physical sensor data used for training the neural networks, ensuring that the testing, training, verification, and validation processes closely resemble those that would occur with the hardware and software components in a real-world lab environment.

In some embodiments, the disclosed systems and methods pertain to training, testing, and validating automated lab systems based on moving devices or objects within simulated environments. In some embodiments, while this disclosure may specifically address an automated lab system based on a moving device, such as a robotic device, it is not intended to be limiting. In some embodiments, the described systems, methods, and/or processes may apply to other robotic systems and/or any other form of automated object.

In some embodiments, the system may serve to train, test, verify, deploy, update, re-verify, and/or deploy one or more neural networks intended for use in an automated lab system based on a moving device. In some embodiments, the system may encompass some or all components, features, and/or functionalities as described herein.

In some embodiments, automated lab systems may gather sensor data from one or more sensors in real-world (e.g., physical) environments. In some embodiments, the sensors may include, without limitation, RADAR sensors, ultrasonic sensors, LIDAR sensors, inertial measurement units (IMUs), microphones, stereo cameras, wide-view cameras, infrared cameras, surround cameras, speed sensors, vibration sensors, steering sensors, and/or other types of sensors. In some embodiments, the systems may involve moving devices, such as robotic devices, other automated systems, and/or objects like drones.

In some embodiments, the automated lab system may consist of hardware that manages the sensor data generated by the sensors (e.g., via a sensor manager within the automation software stack being executed by the hardware). In some embodiments, the automation software stack may also include a world state manager that oversees the environment using one or more scanned images or maps (e.g., 3D maps), localization components, perception components, and similar elements. In some embodiments, the automation software stack may comprise planning components, control components, actuation components, obstacle avoidance components, and other components. In some embodiments, the hardware may be designed for installation within the moving device, functioning as a robotic device and allowing the system to execute an automation software stack for controlling, at least in part, the system through real-world physical environments.

In some embodiments, the sensor data collected by the sensors, along with existing sensor data stored in data repositories, may be utilized by a training subsystem. In some embodiments, the training subsystem may incorporate a cloud-based deep learning infrastructure that leverages artificial intelligence to analyze the sensor data received from the moving devices as robotic devices and/or stored in the data repositories, incorporating or training up-to-date, real-time neural networks for intelligent inferencing in real time. In some embodiments, the training subsystem may consist of one or more GPU servers; for instance, it may include a datacenter equipped with GPUs, TPUs, CPUs, and/or other types of processors.

In some embodiments, the training subsystem may train and/or test various machine learning models, including neural networks for executing tasks associated with one or more layers of the automation software stack. In some embodiments, for example, one or more perception neural networks may be trained and/or tested, which can be utilized for detecting objects in the environment (e.g., lab equipment, personnel, etc.), navigating spaces, and monitoring conditions.

In some embodiments, once trained and/or tested, the neural networks may undergo validation and/or verification through a validation/verification subsystem. In some embodiments, this subsystem may encompass similar components and/or features as the training subsystem. In some embodiments, it may verify and/or validate the performance, accuracy, and/or other criteria related to the neural networks. In some embodiments, once validated, these neural networks may be integrated into software stacks, and the automated lab system may execute these stacks to perform tasks in real-world environments.

In some embodiments, consequently, the system may include a re-simulation system that utilizes physical sensor data generated by moving devices as robotic devices in real-world environments to train, test, verify, and/or validate one or more neural networks for use in the software stacks. In some embodiments, in some examples, the re-simulation system may overlap with simulation systems, as some testing, training, verification, and/or validation may be conducted within a simulated environment.

In some embodiments, the process may encompass data ingestion of new operational data captured and/or generated by one or more moving devices as robotic devices in real-world environments and/or simulated or virtual sensor data from various simulated environments. In some embodiments, the process may include data indexing and curation, data labeling services, model training, model refinement, pruning, fine-tuning, model validation, and updating primary coverage maps. In some embodiments, the process may involve a training loop where new data generated by the moving devices as robotic devices is utilized to train, test, verify, and/or validate one or more perception neural networks, which are subsequently employed by the moving devices to navigate real-world environments.

In some embodiments, a data storage system may be implemented to hold sensor data and/or virtual sensor data produced by one or more real-world sensors of the moving devices as robotic devices and/or virtual sensors of one or more simulated devices, respectively. In some embodiments, data ingestion may involve generating and/or recording the data output from the automation platform of the moving devices.

In some embodiments, data indexing and curation may include indexing metadata related to the output data from the moving devices as robotic devices for further search and/or retrieval. In some embodiments, search indexes may facilitate the retrieval of specific data segments, which can then be tagged and/or flagged for additional processing. In some embodiments, raw data may be stored in a lossless format to allow for further pre-processing and/or quantization. In some embodiments, data labeling services may be employed to tag and/or label the data, including raw data, transformed data, and/or any other data utilized in the process. In some embodiments, tagging and/or labeling may be conducted by a human, a machine, or a combination of both.

In some embodiments, model training may leverage a deep-learning platform to define training applications and execute the training application on a compute cluster (e.g., utilizing the training subsystem). In some embodiments, this compute cluster may comprise one or more GPU-powered servers, each featuring multiple GPUs, PCIe switches, and/or CPUs interconnected via high-speed links. In some embodiments, model refinement, pruning, and/or fine-tuning may entail updating the neural networks to enhance their accuracy and efficacy. In some embodiments, for example, hyper-parameter discovery may be facilitated by an experiment service that monitors information about the hyper-parameter space. In some embodiments, a workflow manager may coordinate and dispatch experiments to multiple nodes concurrently.

In some embodiments, model validation may involve verifying and/or validating the neural networks via the validation/verification subsystem. In some embodiments, once validated, primary coverage mapping may be updated. In some embodiments, for example, once the necessary portions of the software stacks are trained for a specific lab space, the primary coverage map may be refreshed. In some embodiments, in some examples, active learning may be employed; for instance, existing trained models may be used to extract more training data. In some embodiments, the system may utilize these models to evaluate newly collected data and calculate a confidence score for each data entry.

In some embodiments, a workflow may comprise data ingestion, transferring data to dataset stores labeling the data using data labeling services, and training neural networks. In some embodiments, the frames selected for labeling may be randomly chosen. In some embodiments, once the neural networks are trained, they may be applied in simulation and/or re-simulation scenarios. In some embodiments, the workflow may allow for fine-tuning and/or transfer learning, enabling the system to reload models.

In some embodiments, the simulation system may generate a simulation that replicates a virtual environment, such as a simulated lab environment. This simulated lab environment can include various automated lab systems that incorporate moving devices, such as robotic arms, as well as other objects like laboratory tools, containers, and even simulated human operators or lab animals. The global simulation may be hosted within an engine, such as a game engine or another software-development environment. This engine may integrate numerous components, including a rendering engine (for both 2D and 3D graphics), a physics engine (for collision detection and response), sound, scripting, animation, artificial intelligence (AI), networking, streaming, memory management, threading, localization support, scene graphs, cinematics, and various other features necessary for creating a detailed and immersive simulated environment.

In some embodiments, by assigning individual instances, each virtual sensor can process data specific to its perspective within the global simulation. For example, a virtual camera's instance may handle the processing of image data based on the camera's field of view within the simulated lab, while a virtual IMU sensor's instance could process orientation data for the robotic arm it's associated with, reflecting how the arm would perceive and respond to changes in its simulated environment.

In cases where the automated lab system uses software-in-the-loop (SIL) simulation instead, software may be used to simulate or emulate the hardware from HIL objects. This could mean that instead of using the actual physical hardware configured for use in a real lab system, the simulation employs software (or a mix of software and alternative hardware) to emulate the original hardware and replicate its behavior accurately within the virtual environment.

In some embodiments, an example method of operations of a moving device may include environment scanning and 3D model creation. In some embodiments, sensors such as LiDAR, depth cameras, standard cameras, and radar can be used to scan the cleanroom or facility. In some embodiments, sensor data (e.g., point clouds) can be processed using computer vision techniques. In some embodiments, a comprehensive 3D model of the environment can be built.

In some embodiments, an example method of operations of a moving device may include CAD/simulation software integration. In some embodiments, the 3D model can be into CAD/simulation software, and using the CAD/simulation software automation equipment, sensors, control units, actuators, and accessories in the simulated environment can be arranged, for example, to create a relatively accurate digital representation of the physical space.

In some embodiments, an example method of operations of a moving device may include reality check and fine-tuning. For example, in some embodiments, the simulated environment may be with the real-world space, e.g., to identify and correct any discrepancies or refine the digital model for more accuracy or precision.

In some embodiments, an example method of operations of a moving device may include advanced simulation environment setup. For example, the refined 3D model can be imported into advanced simulators like Isaac Sim or similar real-world simulators. In some embodiments, these platforms can be used to design the overall workflow of the automation system.

In some embodiments, an example method of operations of a moving device may include physics property configuration. For example, physical properties for at least some of all objects in the simulated environment can be set, which may include dynamic/static attributes, mass, force, torque, elasticity, etc., to ensure accurate representation of real-world physics.

In some embodiments, an example method of operations of a moving device may include workflow design. For example, end-to-end sequences for client's products may be designed and unit operations for at least some or all objects (machines, consumables, products), can be defined. In some embodiments, detailed process flows within the simulation can be created.

In some embodiments, an example method of operations of a moving device may include artificial intelligence (AI) motion planning. For example, the movement of the robotic system with AI algorithms can be designed. For instance, AI motion planning algorithms can be used to generate detailed waypoints on how each of the joints of a robotic arm would move to operate each of the unit operations.

In some embodiments, an example method of operations of a moving device may include initial real-world deployment. For example, the simulated workflow in the actual cleanroom environment can be deployed and the initial setup and identify any discrepancies can be tested.

In some embodiments, an example method of operations of a moving device may include iterative refinement. For example, any of the aforementioned embodiments in an example method of operations of a moving device can be repeated for the iterative refinement, e.g., to continuously refine the simulation and real-world setup, or to iterate until the process is stable and smooth in both environments.

In some embodiments, an example method of operations of a moving device may include visual checkpoint implementation. For example, visual checkpoints (e.g., AprilTags) for object localization can be added, which can be used, e.g., to compensate for positional and orientational errors, to ensure precise functionality of equipment, sensors, and actuators.

In some embodiments, an example method of operations of a moving device may include automation program export. For example, the automation program script from the simulation can be generated and exported. The script for implementation in the real-world system can be prepared.

In some embodiments, an example method of operations of a moving device may include final workflow verification. For example, the exported program in the real environment can be run and the workflow process and results can be thoroughly checked. Final adjustments can be as necessary.

In some embodiments, an example method of operations of a moving device may include continuous monitoring and optimization. For example, ongoing monitoring of the real-world system can be implemented. The digital twin can be updated to reflect any changes. The digital twin for future optimizations and expansions can be used.

For example, FIG. 6 illustrates an example method of setting up or executing operations of a moving device in some embodiments.

Referring to FIG. 6, in some embodiments, at step 301, in some embodiments, environment scanning, and 3D model creation can be performed. This process may involve the use of sensors, in some embodiments, such as LiDAR, in some embodiments, depth cameras, in some embodiments, standard cameras, in some embodiments, and radar, in some embodiments, to thoroughly scan the cleanroom or facility. The sensor data, in some embodiments, such as point clouds, in some embodiments, can be processed using computer vision techniques to capture detailed information about the environment. From this data, in some embodiments, a comprehensive 3D model of the environment may be built to serve as the foundation for further simulations and analyses.

At step 302, in some embodiments, CAD/simulation software integration may be performed. The previously created 3D model can be imported into CAD or simulation software, allowing for the arrangement of automation equipment, sensors, control units, actuators, and accessories within the simulated environment. This integration enables the creation of an accurate digital representation of the physical space, ensuring that the simulated model closely resembles the real-world setup.

At step 303, in some embodiments, a reality check and fine-tuning of the model may be carried out. This step can involve comparing the simulated environment with the actual physical space to identify and correct any discrepancies. By refining the digital model, maximum accuracy can be achieved, which is essential for realistic simulations.

At step 304, in some embodiments, an advanced simulation environment setup can be conducted. The refined 3D model may be imported into advanced simulators, such as Isaac Sim or other real-world simulation platforms. These platforms allow the design of the overall workflow for the automation system, enabling a high-fidelity simulation that replicates real-world conditions.

At step 305, in some embodiments, the configuration of physics properties may be performed. Physical properties for all objects within the simulated environment, including dynamic/static attributes, mass, force, torque, and elasticity, can be set to ensure accurate representation of real-world physics. This step is crucial for achieving realistic object behavior within the simulation.

At step 306, in some embodiments, workflow design can be carried out. This involves designing end-to-end sequences for the client's products, defining unit operations for all relevant objects, such as machines, consumables, and products, and creating detailed process flows within the simulation. The workflow design provides a blueprint for how the automation system will operate.

At step 307, in some embodiments, domain-specific mechanical tools may be designed. This may involve designing tools that can handle flexible and deformable objects, ensuring the automated system can handle a variety of item types and materials.

At step 308, in some embodiments, AI motion planning can be developed. The movement of the robotic system may be designed using AI algorithms, such as AI motion planning algorithms. These algorithms can generate detailed waypoints to guide each joint of a robotic arm, specifying how it should move to perform each unit operation.

At step 309, in some embodiments, initial real-world deployment may be performed. The simulated workflow can be deployed in the actual cleanroom environment, where the initial setup is tested to identify and address any discrepancies between the simulation and the real world.

At step 310, in some embodiments, iterative refinement can be undertaken. Steps 306, 307, and 308 may be repeated as needed to continuously refine both the simulation and the real-world setup. This iterative process ensures that the operation becomes stable and smooth in both environments.

At step 311, in some embodiments, visual checkpoint implementation may be conducted. Visual checkpoints, such as AprilTags, can be added to enable object localization, helping to correct positional and orientational errors. These checkpoints ensure the precise functionality of equipment, sensors, and actuators within the simulated and real-world systems.

At step 312, in some embodiments, automation program export may be performed. This involves generating and exporting the automation program script from the simulation, preparing it for implementation within the actual physical system.

At step 313, in some embodiments, final workflow verification can be carried out. The exported program may be run in the real environment, allowing for a thorough review of the workflow process and results. Any final adjustments necessary for optimal operation can then be made.

At step 314, in some embodiments, continuous monitoring and optimization may be conducted. Ongoing monitoring of the real-world system can be implemented, and the digital twin may be regularly updated to reflect any changes in the physical environment. This digital twin can be used for future optimizations and expansions, ensuring that the system remains efficient and adaptable to evolving requirements.

Figure 7:
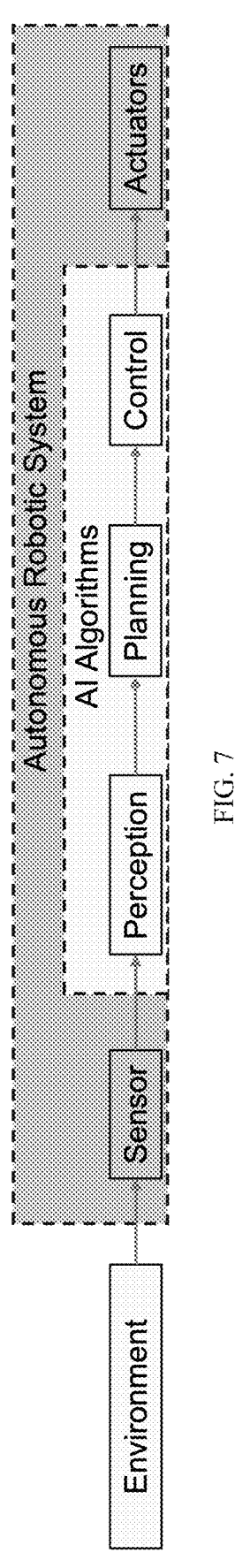
FIG. 7 shows a non-limiting example of an autonomous robotics system flow chart in some embodiments.

For example, FIG. 7 shows a non-limiting example of an autonomous robotics system flow chart in some embodiments. Referring to FIG. 7, to enable full simulation in a digital twin simulator, steps according to any of the foregoing embodiments can be implemented, including building 3D modules for each object and enabling the physical movement for each dynamic object.

In some embodiments, digital-twin and AI enabled plug and play robotic system can be implemented. In some embodiments, the complete design flow features of digital twin simulation and AI decision making pipeline to enable a flexible and customizable plug-and-play autonomous robotic system can be implemented. In some embodiments, according to the present disclosure, a substantially true plug-and-play, interoperable system that can be incorporated into any existing production line. For example, AI empowered plug-and-play feature may allow a moving device such as a robotic arm to move between interfaced machines in a smart and fast fashion in a real-world based on simulation in a digital twin. In some embodiments, interoperable modular feature, e.g., an AI-driven robotics according to the present disclosure can mimic human operators' actual movements so it can operate substantially most and all the machines on the production line. In some embodiments, AI algorithm according to the present disclosure can be custom-built to accommodate the complicated biomanufacturing environment.

In some embodiments, the platforms, systems, media, and methods described herein may include a digital processing device, or use of the same. In some embodiments, the digital processing device includes one or more hardware central processing units (CPUs) or general-purpose graphics processing units (GPGPUs) that carry out the device's functions. In some embodiments, the digital processing device may further comprise an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxce®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random-access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tape drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 8:
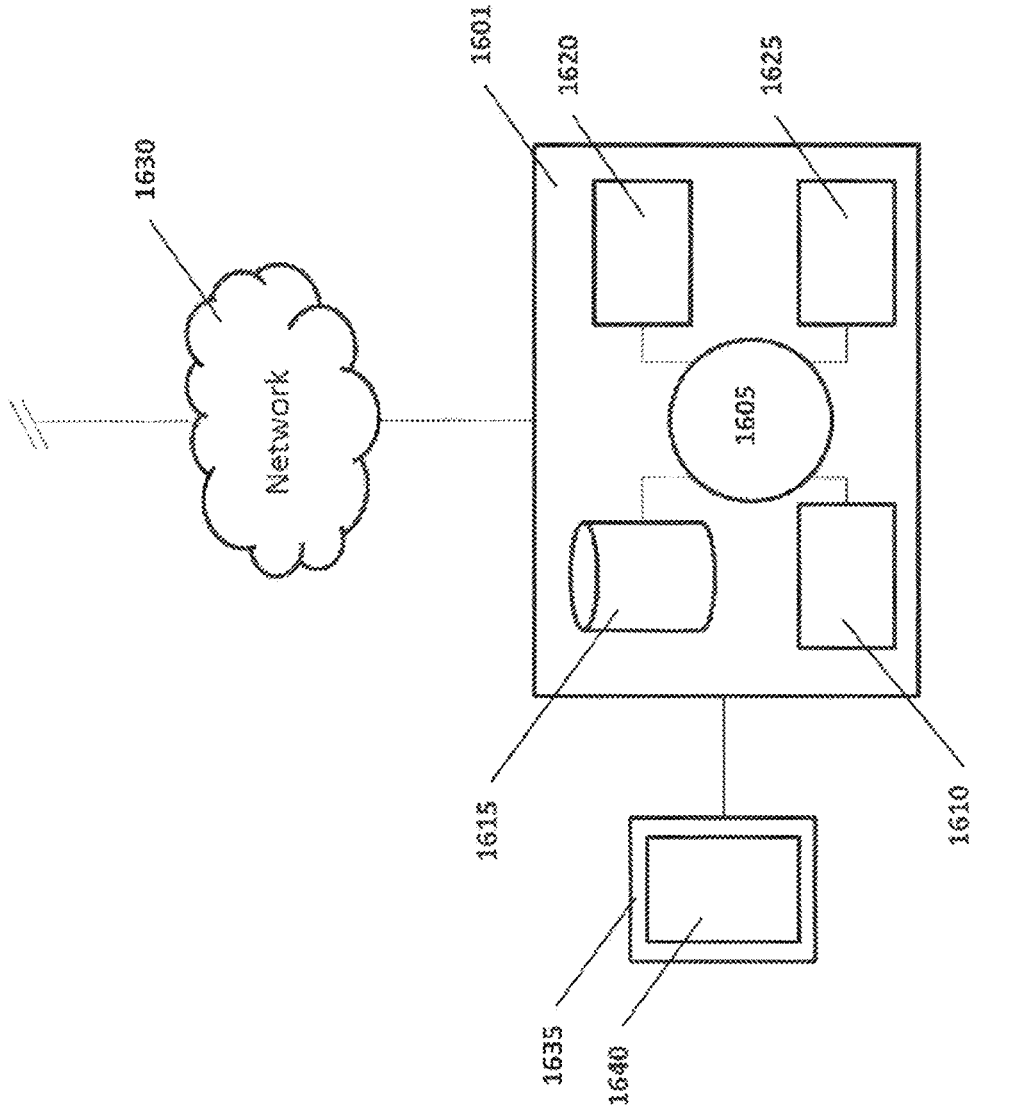
FIG. 8 illustrates a processor system, in accordance with some embodiments.

For example, FIG. 8 illustrates a processor system, in accordance with some embodiments.

Referring to FIG. 8, in a particular embodiment, an exemplary digital processing device 1601 is programmed or otherwise configured to use artificial intelligence or machine learning to set up, plan or perform a robotics procedure. The device 1601 can regulate various aspects of the machine learning and artificial intelligence of the present disclosure, such as, for example, determination of a cut profile in response to data of a patient to be treated and data from previously treated patients and previous procedures as described herein. In this embodiment, the digital processing device 1601 includes a central processing unit (CPU, also "processor" and "computer processor" herein) 1605, which can be a single core or multi core processor, or a plurality of processors for parallel processing. The digital processing device 1601 also includes memory or memory location 1610 (e.g., random-access memory, read-only memory, flash memory), electronic storage unit 1615 (e.g., hard disk), communication interface 1620 (e.g., network adapter) for communicating with one or more other systems, and peripheral devices 1625, such as cache, other memory, data storage and/or electronic display adapters. The memory 1610, storage unit 1615, interface 1620 and peripheral devices 1625 are in communication with the CPU 1605 through a communication bus (solid lines), such as a motherboard. The storage unit 1615 can be a data storage unit (or data repository) for storing data. The digital processing device 1601 can be operatively coupled to a computer network ("network") 1630 with the aid of the communication interface 1620. The network 1630 can be the Internet, an internet and/or extranet, or an intranet and/or extranet that is in communication with the Internet. The network 1630 in some cases is a telecommunication and/or data network. The network 1630 can include one or more computer servers, which can enable distributed computing, such as cloud computing. The network 1630, in some cases with the aid of the device 1601, can implement a peer-to-peer network, which may enable devices coupled to the device 1601 to behave as a client or a server.

Continuing to refer to FIG. 8, the CPU 1605 can execute a sequence of machine-readable instructions, which can be embodied in a program or software. The instructions may be stored in a memory location, such as the memory 1610. The instructions can be directed to the CPU 1605, which can subsequently program or otherwise configure the CPU 1605 to implement methods of the present disclosure. Examples of operations performed by the CPU 1605 can include fetch, decode, execute, and write back. The CPU 1605 can be part of a circuit, such as an integrated circuit. One or more other components of the device 1601 can be included in the circuit. In some cases, the circuit is an application specific integrated circuit (ASIC) or a field programmable gate array (FPGA).

Continuing to refer to FIG. 8, the storage unit 1615 can store files, such as drivers, libraries and saved programs. The storage unit 1615 can store user data, e.g., user preferences and user programs. The digital processing device 1601 in some cases can include one or more additional data storage units that are external, such as located on a remote server that is in communication through an intranet or the Internet.

Continuing to refer to FIG. 8, the digital processing device 1601 can communicate with one or more remote computer systems through the network 1630. For instance, the device 1601 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iphone, Android-enabled device, Blackberry®), or personal digital assistants.

Methods as described herein can be implemented by way of machine (e.g., computer processor) executable code stored on an electronic storage location of the digital processing device 1601, such as, for example, on the memory 1610 or electronic storage unit 1615. The machine executable or machine-readable code can be provided in the form of software. During use, the code can be executed by the processor 1605. In some cases, the code can be retrieved from the storage unit 1615 and stored on the memory 1610 for ready access by the processor 1605. In some situations, the electronic storage unit 1615 can be precluded, and machine-executable instructions are stored on memory 1610.

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, which perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or extensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Small-talk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomo-bile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Sym-bian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nin-tendo® DSi Shop.

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customiz-ing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™ PHP, Python™, and VB.NET, or combinations thereof.

Web browsers (also called Internet browsers) are software applications, designed for use with network-connected digi-tal processing devices, for retrieving, presenting, and tra-versing information resources on the World Wide Web. Suitable web browsers include, by way of non-limiting examples, Microsoft® Internet Explorer®, Mozilla® Fire-fox®, Google® Chrome, Apple® Safari®, Opera Soft-ware® Opera®, and KDE Konqueror. In some embodi-ments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Fire-fox® for mobile, Microsoft® Internet Explorer® Mobile, Amazon® Kindle® Basic Web, Nokia® Browser, Opera Software® Opera® Mobile, and Sony® PSP™ browser.

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module com-prises a file, a section of code, a programming object, a programming structure, or combinations thereof. In further various embodiments, a software module comprises a plu-rality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the platforms, systems, media, and methods disclosed herein include one or more databases, or use of the same. In view of the disclosure provided herein, those of skill in the art will recognize that many databases are suitable for storage and retrieval of information described herein, such as information related to lab operations, automation, and a moving device. In various embodiments, suitable databases include, by way of non-limiting examples, relational databases, non-relational databases, object-oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based.

In some embodiments, the user select data to use with a selected algorithm, for example. This can allow the user to consider outcome likelihood odds and risks for differing scenarios and with a desired outcome versus risk, for example.

The user interface 1700 may comprise a user input 1760 for the user to select parameters of the model used to determine the values of the one or more of the safety and efficacy parameters as disclosed herein. This selection of the parameters can allow the user to pick parameters that may be more helpful than others, and to remove parameters that may be less helpful than others for a particular patient. For example, if a user believes that a parameter such as age is less helpful for predicting outcomes, the user can deselect that parameter as input to the classifier model used to predict the outcome. Alternatively, if the user believes that age is a helpful parameter, the user can select age as a parameter to be used as input to the classifier model.

The user interface 1700 may comprise a user input 1770 for the user to select data to be shown on the display. The data shown on the display may comprise visualization data for example. In some embodiments, the user can select whether to show a suggested treatment profile on the display overlaid with the planned treatment profile the patient after user adjustment. This can be helpful to the user to determine how far the planned treatment profile for the patient deviates from the profile suggested by the algorithm. The user can select additional types of visualization data to be shown on the display. For example, the user can select a planned trajectory of the energy source for the treatment.

NON-LIMITING EMBODIMENTS

The following Examples are detailed by way of illustration only and are not to be construed as limiting in spirit or in scope, many modifications both in materials and in methods will be apparent to those skilled in the art.

1. A method of deploying a robotic device to manipulate at least one workstation associated with a biological process in a space, comprising:

obtaining, by at least one hardware processor, description data associated with a three-dimensional (3D) model of the space, the data comprising first information corresponding to spatial arrangements of the at least one workstation and a plurality of objects associated with the at least one workstation, and second information corresponding to workflow of a process to control the at least one workstation using objects among the plurality of objects;

assigning, by the at least one hardware processor, physical property attributes associated with properties of the plurality of objects, the physical property attributes comprising dynamic attributes, static attributes, at least one mass attribute, at least one force attribute, at least one torque attribute, and at least one elasticity attribute;

assigning, by the at least one hardware processor, a plurality of unit operation attributes associated with unit operations to manipulate at least one object among the plurality of objects in sequence, to generate a process flow information to perform the process to control the at least one workstation, based on the first and second information;

generating, utilizing a machine learning model executed by the at least one hardware processor, instructions to perform a plurality of movements of the robotic device associated with the unit operations in the 3D model of the space, based on the assigned physical property attributes or the generated process flow information associated with the assigned plurality of unit operations;

controlling, based on the generated instructions, the robotic device to execute at least one physical movement associated with at least one generated movement among the plurality of movements in the space with respect to the plurality of the objects; and obtaining, by the at least one hardware processor, at least one discrepancy in a unit operations.

2. A method of controlling a robotic device to manipulate at least one workstation associated with a biological process in a space, comprising:

obtaining, by at least one hardware processor, description data associated with a three-dimensional (3D) model of the space, the data comprising first information corresponding to spatial arrangements of the at least one workstation designed to be directly operated by a human lab worker working in the space and a plurality of objects associated with the at least one workstation, and second information corresponding to workflow of a process to control the at least one workstation by the human lab worker using objects among the plurality of objects;

assigning, by the at least one hardware processor, physical property attributes associated with properties of the plurality of objects, the physical property attributes comprising dynamic attributes, static attributes, at least one mass attribute, at least one force attribute, at least one torque attribute, and at least one elasticity attribute, wherein the dynamic attributes comprise a dynamic attribute directly associated with an outcome of the biological process;

assigning, by the at least one hardware processor, a plurality of unit operation attributes associated with unit operations to manipulate at least one object among the plurality of objects in sequence, to generate a process flow information to perform the process to control the at least one workstation, based on the first and second information;

generating, utilizing a machine learning model executed by the at least one hardware processor, instructions to perform a plurality of movements of the robotic device associated with the unit operations in the 3D model of the space, based on the assigned physical property attributes or the generated process flow information associated with the assigned plurality of unit operations;

controlling, based on the generated instructions, the robotic device to execute at least one physical movement associated with at least one generated movement among the plurality of movements in the space with respect to the plurality of the objects; and obtaining, by the at least one hardware processor, at least one discrepancy in a unit operations.

3. A method of controlling a robotic device to manipulate at least one workstation comprising a plurality of workstations associated with a biological process in a space, comprising:

obtaining, by at least one hardware processor, description data associated with a three-dimensional (3D) model of the space, the data comprising first information corresponding to spatial arrangements of the at least one workstation designed to be directly operated by a human lab worker working in the space comprising the plurality of workstations and a plurality of objects associated with the plurality of workstations, and second information corresponding to workflow of a process to control the at least one workstation by the human lab worker using objects among the plurality of objects;

assigning, by the at least one hardware processor, physical property attributes associated with properties of the plurality of objects, the physical property attributes comprising dynamic attributes, static attributes, at least one mass attribute, at least one force attribute, at least one torque attribute, and at least one elasticity attribute;

assigning, by the at least one hardware processor, a plurality of unit operation attributes associated with unit operations to manipulate at least one object among the plurality of objects in sequence, to generate a process flow information to perform the process to control the plurality of workstations, based on the first and second information;

generating, utilizing a machine learning model executed by the at least one hardware processor, instructions to perform a plurality of movements of the robotic device associated with the unit operations in the 3D model of the space, based on the assigned physical property attributes or the generated process flow information associated with the assigned plurality of unit operations;

controlling, based on the generated instructions, the robotic device to execute at least one physical movement associated with at least one generated movement among the plurality of movements in the space with respect to the plurality of the objects; and obtaining, by the at least one hardware processor, at least one discrepancy in a unit operations.

4. A method of controlling a robotic device to manipulate at least one workstation comprising plurality of workstations associated with a biological process in a space, comprising:

obtaining, by at least one hardware processor, description data associated with a three-dimensional (3D) model of the space, the data comprising first information corresponding to spatial arrangements of the at least one workstation designed to be directly operated by a human lab worker working in the space comprising a plurality of workstations and a plurality of objects associated with the plurality of workstations, and second information corresponding to workflow of a process to control the at least one workstation by the human lab worker using objects among the plurality of objects;

assigning, by the at least one hardware processor, physical property attributes associated with properties of the plurality of objects, the physical property attributes comprising dynamic attributes, static attributes, at least one mass attribute, at least one force attribute, at least one torque attribute, and at least one elasticity attribute, wherein the dynamic attributes comprise a dynamic attribute directly associated with an outcome of the biological process;

assigning, by the at least one hardware processor, a plurality of unit operation attributes associated with unit operations to manipulate at least one object among the plurality of objects in sequence, to generate a process flow information to perform the process to control the plurality of workstations, based on the first and second information;

generating, utilizing a machine learning model executed by the at least one hardware processor, instructions to perform a plurality of movements of the robotic device associated with the unit operations in the 3D model of the space, based on the assigned physical property attributes or the generated process flow information associated with the assigned plurality of unit operations;

controlling, based on the generated instructions, the robotic device to execute at least one physical movement associated with at least one generated movement among the plurality of movements in the space with respect to the plurality of the objects; and obtaining, by the at least one hardware processor, at least one discrepancy in a unit operations.

5. The method of embodiment 1-4, wherein instructions to perform a plurality of movements of the robotic device includes a movement to couple the robotic device with an end module among a plurality of end modules configured to interact with the plurality of objects.

6. The method of embodiment 1-4, wherein instructions to perform a plurality of movements, of the robotic device includes a movement of the robotic device to switch from one end module to another end module among a plurality of end modules configured to interact with the plurality of objects.

7. The method of embodiment 5-6, wherein the plurality of end modules comprises a module to interact with a deformable object or a flexible bag, a module to interact with a housing containing the deformable object or the flexible bag, a module to interact with a touch screen, a module to interact with a switch, and a module to interact with a tube connected to the flexible bag.

8. The method of embodiment 5-7, wherein the plurality of end modules includes a mechanical tool couplable to the robotic device.

9. The method of embodiment 1-8, wherein at least one of the plurality of objects is configured to be operated by a human lab worker.

10. The method of embodiment 1-8, wherein the space is a space previously occupied by the lab worker.

11. The method of embodiment 1-10, wherein the at least one workstation is designed to be directly operated by a human lab worker working in the space 12. The method of embodiment 1-10, wherein the at least one workstation is configured to be used by a human lab worker.

13. The method of embodiment 1-12, wherein the method further comprises rearranging the at least one workstation based on a moving path of the robotic device.

14. The method of embodiment 1-13, wherein the method further comprises modifying, by at least one hardware processor, at least one physical property attribute among the assigned physical property attributes based on the at least one discrepancy.

15. The method of embodiment 1-13, wherein the method further comprises modifying, by at least one hardware processor, at least one unit operation attribute among the assigned plurality of unit operation attributes based on the at least one discrepancy.

16. The method of embodiment 1-13, wherein the method further comprises modifying, by at least one hardware processor, the instructions to perform the plurality of movements of the robotic device associated with the unit operations in the 3D model of the space based on the at least one discrepancy.

17. The method of embodiment 1-16, wherein the description data is generated based on 3D scanning of the space.

18. The method of embodiment 1-16, wherein the description data is generated based on 3D scanning of the space using a scanning sensor.

19. The method of embodiment 1-16, wherein the description data is generated based on 3D scanning of the space using a scanning sensor.

20. The method of embodiment 1-16, wherein the description data is generated based on 3D scanning of the space using a scanning sensor, wherein the scanning sensor is one or more scanning sensors comprising a LiDAR, a depth camera, a standard cameras, a radar, a sonar, a light sensor, an infrared sensor, or any combination thereof.

21. The method of embodiment 18-20, wherein the description data is generated based on processing of data generated based on the scanning sensor using a computer vision technique.

22. The method of embodiment 1-21, wherein obtaining the description data comprises generating the description data.

23. The method of embodiment 1-22, wherein obtaining the description data comprises importing the 3D model into CAD or simulation application.

24. The method of embodiment 1-23, wherein obtaining the description data comprises arranging the plurality of objects in the 3D model of the space.

25. The method of embodiment 1-24, wherein the plurality of objects comprises a bio reactor, a culturing device, a user interface, a display, automation equipment, a sensor, a control unit, an actuator, and an accessory associated with a unit operation among the plurality of unit operations.

26. The method of embodiment 1-24, wherein the plurality of objects comprises a portion of a bio reactor, a portion of a culturing device, a portion of a user interface, a portion of a display, a portion of automation equipment, a portion of a sensor, a portion of a control unit, a portion of an actuator, and a portion of an accessory associated with a unit operation among the plurality of unit operations.

27. The method of embodiment 1-26, wherein obtaining the description data comprises generating a digital representation of the space corresponding to the physical space.

28. The method of embodiment 27, wherein obtaining the description data comprises checking the accuracy of correspondences between the digital representation and the physical space.

29. The method of embodiment 27-28, wherein obtaining the description data comprises identifying a difference between the digital representation and the physical space and modifying the digital representation based on the difference.

30. The method of embodiment 27-29, wherein obtaining the description data comprises refining the digital representation.

31. The method of embodiment 1-30, wherein obtaining the description data comprises importing the 3D model into an advanced simulator to generate the second information.

32. The method of embodiment 1-30, wherein obtaining the description data comprises importing the 3D model into Isaac Sim application to generate the second information.

33. The method of embodiment 1-32, wherein assigning the physical property attributes comprises setting physical property values of the physical property attributes based on the properties of the plurality of objects.

34. The method of embodiment 1-32, wherein assigning the physical property attributes comprises testing physical property values of the physical property attributes based on the properties of the plurality of objects or law of physics.

35. The method of embodiment 1-34, wherein assigning the plurality of unit operation attributes comprises defining unit operations based on the plurality of objects.

36. The method of embodiment 1-34, wherein the plurality of objects comprises a device, a machine, a consumable, a product, or a combination thereof.

37. The method of embodiment 1-36, wherein generating the process flow information comprises generating an end-to-end sequence of unit operations among the plurality of unit operations.

38. The method of embodiment 1-37, wherein generating the instructions to perform the plurality of movements of the robotic device comprises using an artificial intelligence (AI) motion planning algorithm to generate a plurality of way points indicating movements of joints comprised in the robotic device.

39. The method of embodiment 1-37, wherein generating the instructions to perform the plurality of movements of the robotic device comprises using an artificial intelligence (AI) motion planning algorithm to generate a plurality of way points indicating movements of joints comprised in the robotic device to operate at one unit operation among the unit operations.

40. The method of embodiment 1-39, wherein controlling the robotic device to execute the at least one physical movement comprises deploying the at least one physical movement based on the generated process flow information in the physical space.

41. The method of embodiment 1-40, wherein the method further comprises assigning visual check point attributes to the plurality of objects for object localization in the space.

42. The method of embodiment 1-40, wherein the method further comprises assigning AprilTags as visual checkpoint attributes to the plurality of objects for object localization in the space.

43. The method of embodiment 41-42, wherein the method further comprises using the visual check point attributes to compensate for a positional or orientational error.

44. The method of embodiment 1-43, wherein the method further comprises generating and exporting automation program scripts based on the instructions.

Of note, the exemplar embodiments of the disclosure described herein do not limit the scope of the invention since these embodiments can be merely examples of the embodiments of the invention. Any equivalent embodiments can be intended to be within the scope of this invention. Indeed, various modifications of the disclosure, in addition to those shown and described herein, such as alternative useful combinations of the elements described, may become apparent to those skilled in the art from the description. Such modifications and embodiments can be also intended to fall within the scope of the appended claims.

What is claimed is:

1. A method of controlling a robotic device to manipulate at least one workstation among a plurality of workstations associated with a biological process in a laboratory space, comprising:

scanning a laboratory space comprising a plurality of workstations designed to be directly operated by a human lab worker working in the laboratory space and a plurality of objects associated with the plurality of workstations to generate a three-dimensional (3D) model of the space, wherein the plurality of objects includes a plurality of end modules respectively configured to couple to a robotic device to interact with the plurality of objects;

obtaining, by at least one hardware processor, description data associated with the three-dimensional (3D) model of the space, the description data comprising:

first information corresponding to spatial arrangements of the plurality of workstations, and the plurality of objects, and second information corresponding to workflow of a process to control the at least one workstation by the human lab worker using the plurality of objects;

assigning, by the at least one hardware processor, a plurality of physical property attributes each associated with a property of an object among the plurality of objects, the plurality of physical property attributes comprising dynamic attributes, static attributes, at least one mass attribute, at least one force attribute, at least one torque attribute, and at least one elasticity attribute, wherein the dynamic attributes comprise a dynamic attribute directly associated with an outcome of the biological process, wherein at least one attribute among the plurality of physical property attributes is associated with the plurality of end modules;

assigning, by the at least one hardware processor, a plurality of unit operation attributes associated with a plurality of unit operations to manipulate at least one object among the plurality of objects in sequence, to generate a process flow information based on the plurality of unit operation attributes to perform the process to control the at least one workstation, based on the first and second information;

generating, at least partially by a machine learning model executed by the at least one hardware processor, instructions to perform a plurality of movements of the robotic device associated with the plurality of unit operations in the 3D model of the space, based on the assigned plurality of physical property attributes and the generated process flow information associated with the assigned plurality of unit operations attributes, wherein the plurality of movements comprises a movement to selectively couple the robotic device with an end module among the plurality of end modules based on the assigned plurality of physical property attributes;

controlling, based on the generated instructions, the robotic device to execute at least one physical movement associated with the instructions to perform the plurality of movements in the space with respect to the plurality of the objects in one of the plurality of unit operations;

obtaining, by the at least one hardware processor, data associated with at least one discrepancy between the at least one physical movement and the instructions in the one of the plurality of unit operations; and utilizing the obtained data associated with the at least one discrepancy with an iterative refinement algorithm configured to continuously adjust the movement based on the at least one discrepancy or with the machine learning model, to train the machine learning model with the at least one discrepancy.

2. The method of claim 1, wherein the plurality of end modules comprises a module to interact with a deformable object or a flexible bag, a module to interact with a housing containing the deformable object or the flexible bag, a module to interact with a touch screen, a module to interact with a switch, and a module to interact with a tube connected to the flexible bag.

3. The method of claim 1, wherein the plurality of end modules includes a mechanical tool couplable to the robotic device.

4. The method of claim 1, wherein the at least one workstation is designed to be directly operated by a human lab worker working in the space.

5. The method of claim 1, wherein the method further comprises modifying, by at least one hardware processor, the instructions to perform the plurality of movements of the robotic device associated with the unit operations in the 3D model of the space based on the at least one discrepancy.

6. The method of claim 1, wherein the description data is generated using a scanning sensor.

7. The method of claim 1, wherein the description data is generated using a scanning sensor, wherein the scanning sensor is one or more scanning sensors comprising a LiDAR, a depth camera, a standard cameras, a radar, a sonar, a light sensor, an infrared sensor, or any combination thereof.

8. The method of claim 6, wherein the description data is generated based on processing of data generated based on the scanning sensor using a computer vision technique.

9. The method of claim 1, wherein obtaining the description data comprises arranging the plurality of objects in the 3D model of the space.

10. The method of claim 1, wherein the plurality of objects comprises a bio reactor, a culturing device, a user interface, a display, automation equipment, a sensor, a control unit, an actuator, and an accessory associated with a unit operation among the plurality of unit operations.

11. The method of claim 1, wherein the plurality of objects comprises a portion of a bio reactor, a portion of a culturing device, a portion of a user interface, a portion of a display, a portion of automation equipment, a portion of a sensor, a portion of a control unit, a portion of an actuator, and a portion of an accessory associated with a unit operation among the plurality of unit operations.

12. The method of claim 1, wherein obtaining the description data comprises generating a digital representation of the space corresponding to the physical space.

13. The method of claim 12, wherein obtaining the description data comprises identifying a difference between the digital representation and the physical space and modifying the digital representation based on the difference.

14. The method of claim 1, wherein obtaining the description data comprises importing the 3D model into Isaac Sim application to generate the second information.

15. The method of claim 1, wherein assigning the plurality of unit operation attributes comprises defining unit operations based on the plurality of objects.

16. The method of claim 1, wherein the plurality of objects comprises a device, a machine, a consumable, a product, or a combination thereof.

17. The method of claim 1, wherein generating the process flow information comprises generating an end-to-end sequence of unit operations among the plurality of unit operations.

18. The method of claim 1, wherein generating the instructions to perform the plurality of movements of the robotic device comprises using an artificial intelligence (AI) motion planning algorithm to generate a plurality of way points indicating movements of joints comprised in the robotic device.

19. The method of claim 1, wherein generating the instructions to perform the plurality of movements of the robotic device comprises using an artificial intelligence (AI) motion planning algorithm to generate a plurality of way points indicating movements of joints comprised in the robotic device to operate at one unit operation among the unit operations.

20. The method of claim 1, wherein controlling the robotic device to execute the at least one physical movement comprises deploying the at least one physical movement based on the generated process flow information in the physical space.

21. The method of claim 1, wherein the method further comprises assigning visual check point attributes to the plurality of objects for object localization in the space.

22. The method of claim 1, wherein the method further comprises assigning AprilTags as visual checkpoint attributes to the plurality of objects for object localization in the space.

23. The method of claim 21, wherein the method further comprises using the visual check point attributes to compensate for a positional or orientational error.

* * * * *